(12) United States Patent
Becker et al.

(10) Patent No.: US 12,488,881 B2
(45) Date of Patent: Dec. 2, 2025

(54) SYSTEM METHOD AND NETWORK FOR EVALUATING THE PROGRESS OF A MANAGED CARE ORGANIZATION PATIENT WELLNESS GOALS

(71) Applicants: Leslie L. Becker, Mableton, GA (US); Regenald J. Flake, Mableton, GA (US)

(72) Inventors: Leslie L. Becker, Mableton, GA (US); Regenald J. Flake, Mableton, GA (US)

( * ) Notice: Subject to any disclaimer, the term of this patent is extended or adjusted under 35 U.S.C. 154(b) by 294 days.

(21) Appl. No.: 17/893,432

(22) Filed: Aug. 23, 2022

(65) Prior Publication Data

US 2023/0065860 A1    Mar. 2, 2023

Related U.S. Application Data

(60) Provisional application No. 63/236,960, filed on Aug. 25, 2021.

(51) Int. Cl.
| | |
|---|---|
| G16H 40/20 | (2018.01) |
| A61B 5/02 | (2006.01) |
| G16H 10/60 | (2018.01) |
| G16H 20/00 | (2018.01) |
| G16H 40/67 | (2018.01) |
| G16H 50/70 | (2018.01) |

(52) U.S. Cl.
CPC ............... *G16H 40/20* (2018.01); *A61B 5/02* (2013.01); *G16H 10/60* (2018.01); *G16H 20/00* (2018.01); *G16H 40/67* (2018.01); *G16H 50/70* (2018.01)

(58) Field of Classification Search
None
See application file for complete search history.

(56) References Cited

U.S. PATENT DOCUMENTS

| | | | | |
|---|---|---|---|---|
| 2011/0225114 | A1* | 9/2011 | Gotthardt | G16H 10/20 706/50 |
| 2016/0358116 | A1* | 12/2016 | Cline | G16H 10/60 |
| 2017/0235909 | A1* | 8/2017 | Lozano | G16H 40/20 705/3 |

\* cited by examiner

*Primary Examiner* — Stella Higgs
(74) *Attorney, Agent, or Firm* — H. Brock Kolls

(57) ABSTRACT

The present invention relates to evaluating the progress of a managed care organization's (MCO) patient wellness goals using a segmented patient population and patient self-reported medical readings. In operation, a wellness area and goal are predefined, and the patient's self-reported medical readings relate to the wellness area and goal. The patient population can be subdivided with a patient population segmentation rule creating a patient population recordset. An analysis is then performed on the patient population recordset to determine a 'percentage of goal' based on patient medical readings when compared to the predefined wellness goal. The 'percentage of goal' can be determined for the managed care organization as well as for individual patients, and individual healthcare facilities that are assigned to the managed care organization. Wellness areas that goals can be set for include hypertension, diabetes, body weight, body mass index, cholesterol, and other wellness areas.

20 Claims, 20 Drawing Sheets

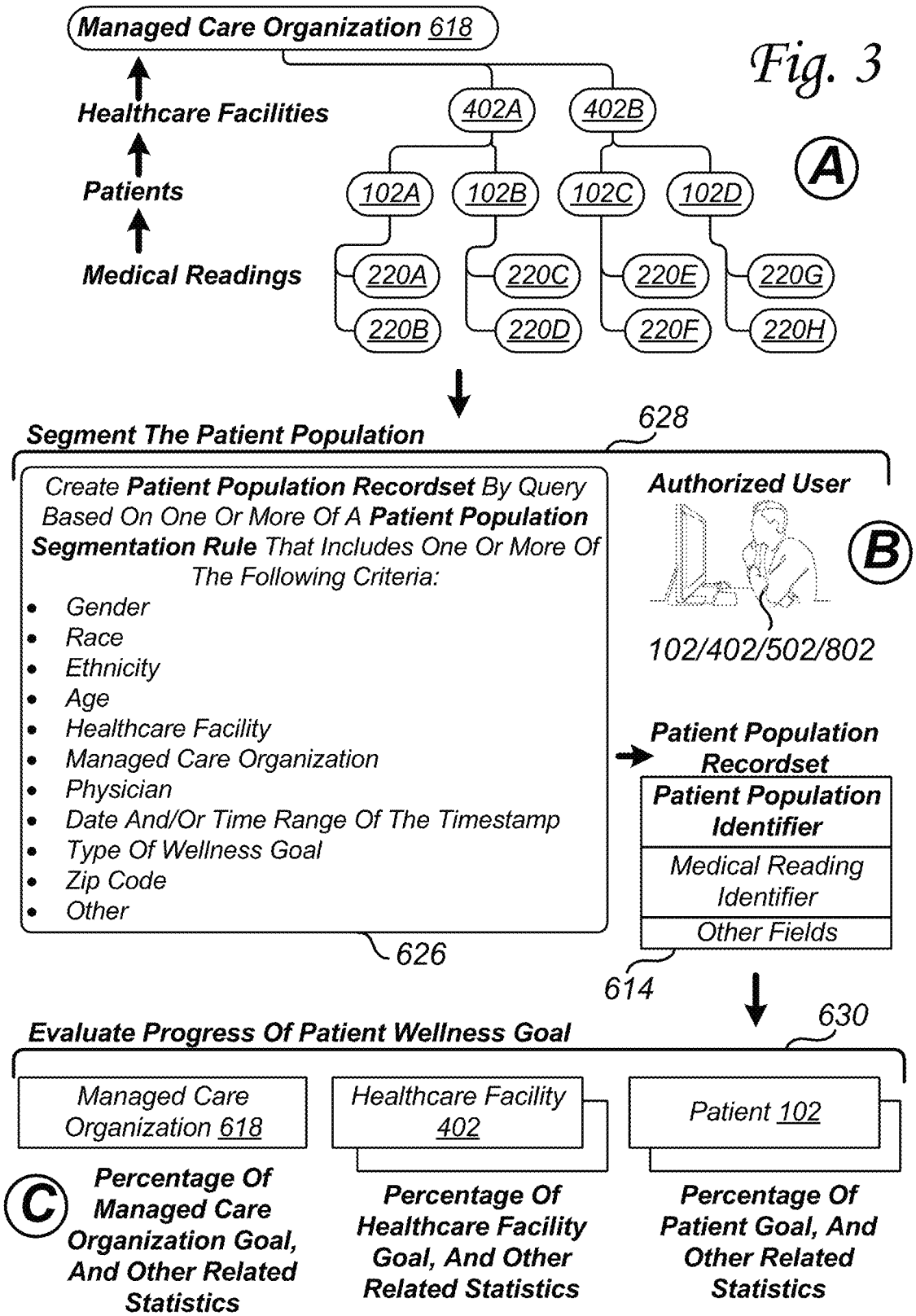

Fig. 11

SYSTEM METHOD AND NETWORK FOR EVALUATING THE PROGRESS OF A MANAGED CARE ORGANIZATION PATIENT WELLNESS GOALS

CROSS-REFERENCE TO RELATED APPLICATIONS

This application contains subject matter which is related to the subject matter of the following co-pending application. The below-listed application is hereby incorporated herein by reference in its entirety:
This is a U.S. non-provisional application that claims the benefit of a U.S. provisional application, Ser. No. 63/236,960, inventor Leslie L. Becker et al., entitled "BLOOD PRESSURE MONITORING SYSTEM AND METHOD", filed Aug. 25, 2021.

TECHNICAL FIELD OF THE INVENTION

This invention relates to a system, method, and network for evaluating the progress of a managed care organization's patient wellness goals and particularly to using a segmented patient population and patient self-reported medical readings to determine a 'percentage of goal' when compared to a predefined wellness goal. The percentage of goals can be determined for the managed care organization as well as individual patients, and individual healthcare facilities that are assigned to the managed care organization. Wellness areas that goals can be set for include hypertension, diabetes, body weight, body mass index, cholesterol, and other wellness areas.

BACKGROUND OF THE INVENTION

Before our invention, it was difficult for managed care organizations to track progress towards meeting their patient population wellness goals through individual patient medical readings. With many types of patient wellness goals, it was difficult and costly for patients to access healthcare facilities and physicians frequently enough to repeat the kinds of medical screen tests that result in the type of data that a managed care organization can use to analyze trends and evaluate the effectiveness of certain medical treatments.

Another shortcoming is that often managed care organizations' funding decisions are based on obtaining a certain 'percentage of goal', such as for hypertension 70% of patient blood pressure readings should be 140 systolic over 90 diastolic or less. The absence of a way for patients to easily report blood pressure readings in combination with the inability of the managed care organization to perform data analysis on a sufficiently sized patient population of blood pressure readings can lead to funding concerns for the managed care organization and treatment concerns for patients. This same type of gap for hypertension existed in other wellness areas such as weight management, diabetes, cholesterol, and other areas.

The present invention addresses these and other shortcomings by providing a system, method, and network for evaluating the progress of a managed care organization's patient wellness goals and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a method of evaluating the progress of a managed care organization's patient wellness goals using a segmented patient population and patient self-reported medical readings. The method comprises the steps of allowing a healthcare evaluator, using a computing device, to data communicate with one or more servers. Defining a predetermined wellness goal. Creating, by the server, a patient record for at least one patient, the patient record comprises a patient identifier. Creating, by the server, a healthcare facility record for one or more of a healthcare facility. The healthcare facility record comprises a healthcare facility identifier, and the patient identifier of each patient who is receiving treatment at the healthcare facility. And, creating, by the server, a managed care organization record that comprises the healthcare facility identifier for each healthcare facility associated with a managed care organization.

The method continues by distributing a medical monitoring device to each of the more than one patients. Measuring, by way of the patient, for each patient more than one medical reading, repeatedly over a time period by way of the medical monitoring device, the patient identifier, and the medical reading is data communicated to the server. Creating, by the server, a medical reading record for each medical reading received, the medical reading record comprises a medical reading identifier, the patient identifier, the healthcare facility identifier associated with the patient identifier, the medical reading, and a date and a timestamp that indicates when the medical reading was taken.

The method continues by determining, by the server, a patient population recordset that comprises each of the medical reading identifiers returned in a query of one or more of a patient population segmentation rule from the plurality of the medical reading records that are associated with one or more of the patient identifier that is associated with one or more of the healthcare facility identifier that is associated with the managed care organization record. Calculating, by the server, each the following: for each unique one of the patient identifier in the patient population recordset a percentage of patient goal based on the predetermined wellness goal is determined, for each unique one of the healthcare facility identifier in the patient population recordset a percentage of healthcare facility goal based on the predetermined wellness goal is determined, and for all the records in the patient population recordset a percentage of managed care organization (MCO) goal based on the predetermined wellness goal is determined.

The method continues by displaying the received plurality of display data from the server on the computing device. The display data is accessible to the healthcare evaluator or other authorized users, the display data is related to at least one of the following: one or more patient record and the percentage of patient goal based on the predetermined wellness goal that the patient record is associated with, one or more healthcare facility record and the percentage of healthcare facility goal based on the predetermined wellness goal that the healthcare facility record is associated with, and the percentage of managed care organization goal based on the predetermined wellness goal.

Additional shortcomings of the prior art are overcome and additional advantages are provided through the provision of a system for evaluating the progress of a managed care organization's patient wellness goals using a segmented patient population and patient self-reported medical readings can comprise one or more of a server. The server can comprise a microprocessor and a memory.

The system comprises at least one computing device that a healthcare evaluator or other authorized users use to data communicate with the server.

A medical monitoring device can be distributed to each of more than one patient. The medical monitoring device can be used by the patient to effectuate measuring more than one medical reading repeatedly over a time period. A patient identifier and the medical reading can be data communicated to the server by way of the medical monitoring device or by way of a personal computing device that is proximate to the patient that data communicates with the medical monitoring device and the server.

In operation, the memory is encoded with instructions that when executed by the microprocessor perform the steps of defining a predetermined wellness goal, and creating, by the server, a patient record for at least one patient. The patient record comprises a patient identifier.

The steps continue by creating, by the server, a healthcare facility record for one or more healthcare facility. The healthcare facility record comprises a healthcare facility identifier and the patient identifier of each patient 102 who is receiving treatment at the healthcare facility. By the server, a managed care organization record is created that comprises the healthcare facility identifier for each healthcare facility associated with a managed care organization. By the server, a medical reading record is created for each medical reading received. The medical reading record comprises a medical reading identifier, the patient identifier, the healthcare facility identifier associated with the patient identifier, the medical reading, and a date and a timestamp that indicates when the medical reading was taken.

The steps continue by determining, by the server, a patient population recordset that comprises each of the medical reading identifiers returned in a query of one or more of a patient population segmentation rule from a plurality of the medical reading records that are associated with one or more of the patient identifier that is associated with one or more of the healthcare facility identifier that is associated with the managed care organization record.

The server then calculates each the following: for each unique one of the patient identifier in the patient population recordset a percentage of patient goal based on the predetermined wellness goal is determined, and for each unique one of the healthcare facility identifier in the patient population recordset a percentage of healthcare facility goal based on the predetermined wellness goal is determined, and for all the records in the patient population recordset a percentage of managed care organization goal based on the predetermined wellness goal is determined.

The received plurality of display data from the server is then displayed on the computing device. The display data are accessible to the healthcare evaluator or other authorized users. The display data is related to at least one of the following: one or more of the patient record and the percentage of patient goal based on the predetermined wellness goal that the patient record is associated with, one or more of the healthcare facility record, and the percentage of healthcare facility goal based on the predetermined wellness goal that the healthcare facility record is associated with, and the percentage of managed care organization goal based on the predetermined wellness goal.

Additional shortcomings of the prior art are overcome and additional advantages are provided through the provision of a method of evaluating the progress of a managed care organization's patient wellness goals using a segmented patient population and patient self-reported medical readings. The method comprises the steps of allowing a healthcare evaluator, a healthcare facility user, a physician, or a patient, using a computing device, to data communicate with one or more servers. Defining a predetermined wellness goal. Creating, by the server, a patient record for at least one patient, the patient record comprises a patient identifier. Creating, by the server, a healthcare facility record for one or more of a healthcare facility. The healthcare facility record comprises a healthcare facility identifier, and the patient identifier of each patient who is receiving treatment at the healthcare facility. And, creating, by the server, a managed care organization record that comprises the healthcare facility identifier for each healthcare facility associated with a managed care organization.

The method continues by distributing a medical monitoring device to each of the more than one patients. Measuring, by way of the patient, for each patient more than one medical reading, repeatedly over a time period by way of the medical monitoring device, the patient identifier, and the medical reading is data communicated to the server. Creating, by the server, a medical reading record for each medical reading received, the medical reading record comprises a medical reading identifier, the patient identifier, the healthcare facility identifier associated with the patient identifier, the medical reading, and a date and a timestamp that indicates when the medical reading was taken.

The method continues by determining, by the server, a patient population recordset that comprises each of the medical reading identifiers returned in a query of one or more of a patient population segmentation rule from the plurality of the medical reading record that is associated with one or more of the patient identifiers that is associated with one or more of the healthcare facility identifiers that is associated with the managed care organization record. Calculating, by the server, each the following: for each unique one of the patient identifier in the patient population recordset a percentage of patient goal based on the predetermined wellness goal is determined, for each unique one of the healthcare facility identifier in the patient population recordset a percentage of healthcare facility goal based on the predetermined wellness goal is determined, and for all the records in the patient population recordset a percentage of managed care organization goal based on the predetermined wellness goal is determined.

The method continues by displaying, accessible to the patient or the physician, received plurality of a display data from the server on the computing device. The display data are related to one or more of the patient records and the percentage of patient goal based on the predetermined wellness goal that the patient record is associated with. Displaying, accessible to the healthcare facility user, received plurality of a display data from the server on the computing device. The display data are related to one or more of the patient records and the percentage of patient goal based on the predetermined wellness goal that the patient record is associated with, and one or more of the healthcare facility records and the percentage of healthcare facility goal based on the predetermined wellness goal that the healthcare facility record is associated with. And, displaying, accessible to the healthcare evaluator or other authorized users, received plurality of a display data from the server on the computing device. The display data are related to the percentage of managed care organization goal based on the predetermined wellness goal, one or more of the patient record and the percentage of patient goal based on the predetermined wellness goal that the patient record is associated with, and one or more of the healthcare facility record and the percentage of healthcare facility goal based on the predetermined wellness goal that the healthcare facility record is associated with.

System and computer program products corresponding to the above-summarized methods are also described and claimed herein.

Additional features and advantages are realized through the techniques of the present invention. Other embodiments and aspects of the present invention are described in detail herein and are considered a part of the claimed invention. For a better understanding of the invention with advantages and features, refer to the description and the drawings.

BRIEF DESCRIPTION OF THE FIGURES

The foregoing and other objects, features, and advantages of the invention are apparent from the following detailed description taken in conjunction with the accompanying drawings in which:

FIG. 3 illustrates one example of how the progress of a managed care organization's patient wellness goals is evaluated;

FIGS. 7-11 illustrate examples of user interface screens for evaluating the progress of a managed care organization's patient wellness goals;

Figure 1:
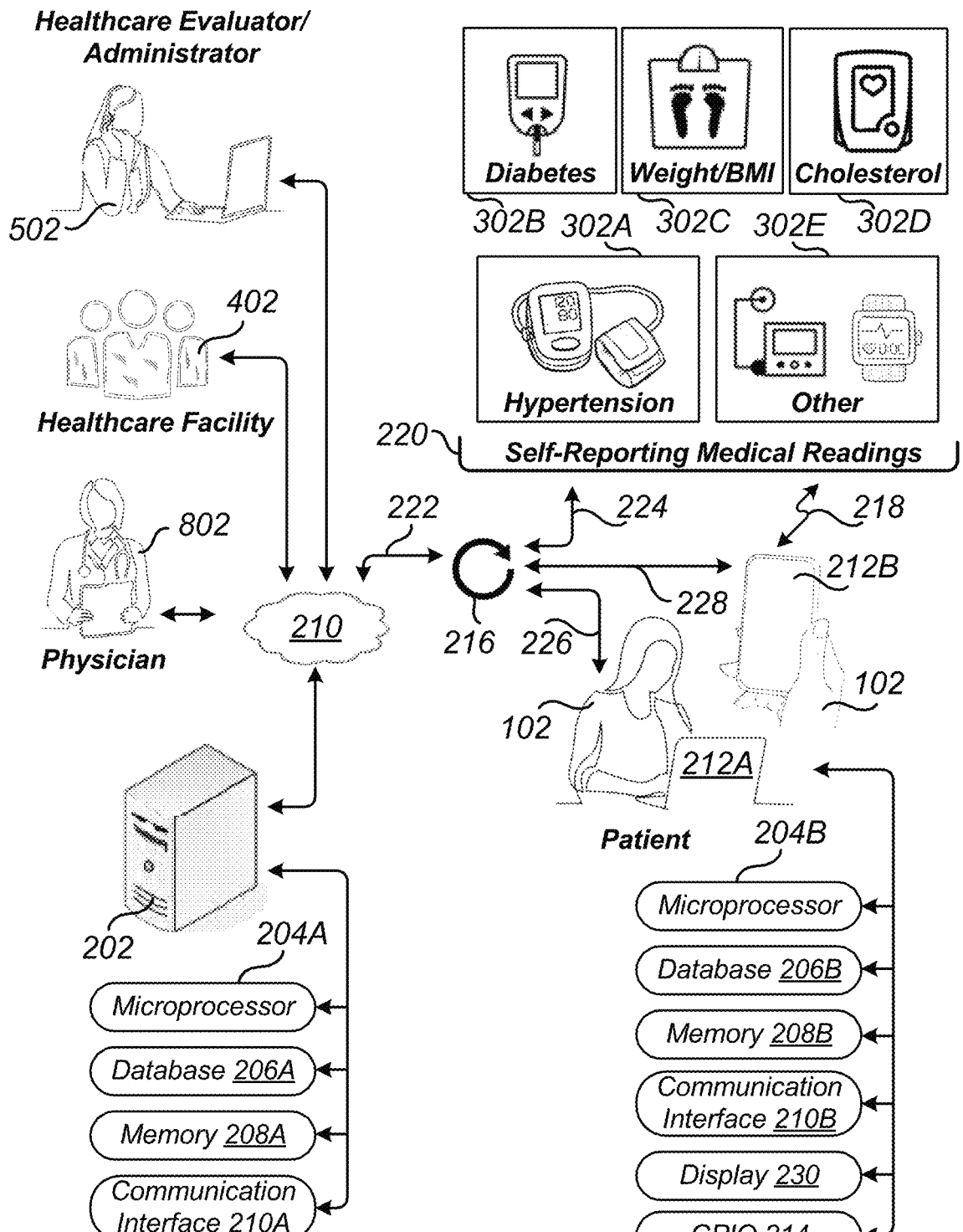
FIG. 1 illustrates one example of a network for evaluating the progress of a managed care organization's patient wellness goals.

The detailed description explains the preferred embodiments of the invention, together with advantages and features, by way of example with reference to the drawings.

DETAILED DESCRIPTION OF THE INVENTION

The systems, methods, and computer network in the present invention comprise a plurality of remote data processing resources 202 including servers, and a plurality of data communicating devices 212A-B such as smart devices, smartphones, medical monitoring devices 302A-E, and other devices that make it possible for patients 102 to measure and self-reported medical readings 220 related to wellness goals. In addition, the present invention allows healthcare evaluators 502 and other authorized users to evaluate the progress of managed care organizations (MCO) 618 in meeting those patient wellness goals at the managed care organization level, the individual or group of healthcare facility level, the physician level, and the patient level.

In an exemplary embodiment, in general, the medical monitoring devices 302A-E are Food & Drug Administration (FDA) registered/certified and specifically, the blood pressure device 302A is considered to be self-monitoring blood pressure (SMBP) validated.

Such self-reported medical readings 220 can include blood pressure, body weight/body mass index (BMI), glucose readings, electrocardiogram (EKG), electroencephalogram (EEG), heart pulse, cholesterol level, blood oxygen levels, and other medical readings. Patient 102 can self-administer the taking of medical readings with the medical monitoring device 302A-E and those medical readings can be data communicated 222 in a variety of ways across a global communication network 210 to a data processing resource 202 such as a server. The medical readings received at the remote data processing resource 202 can be placed in medical reading records 612 and stored in a database 206A for future data analysis. The Internet is one example of a global communication network 210.

The medical readings from patient 102 can be accrued at the data processing resource 202 as medical reading records 612 in a database 206A at any frequency over a time period of any length and stored in a manner that allows a statistical analysis of the medical readings at the patient 102 level, the population of patient level, physician 802 level assigned to the patient, healthcare facility 402 level assigned to the patient 102, managed care organization 618 level where one or more healthcare facility 402 is assigned, and at other levels can be performed as may be required and/or desired in a particular embodiment.

In operation, patients 102 are assigned to a healthcare facility 402, and the healthcare facility is assigned to a managed care organization 618. The managed care organization 618 can be assigned one or more healthcare facility 402, and each of the health care facility 402 can be assigned more than one patient 102. Physicians 802 can be assigned to patient 102 and through association with patient 102 associated with a healthcare facility 402 and a managed care organization 618.

Medical monitoring devices 302 can be distributed to patients 102 to monitor a number of different wellness goals such as hypertension 302A, diabetes 302B, body weight or body mass index (BMI) 302C, cholesterol 302D, and/or other wellness areas 302D. Patients 102 use the medical monitoring devices 302 to make periodic self-reported medical reading 220 that are data communicated over a global communication network 210 to a remote data processing resource 210.

The remote data processing resource 202 is operationally related to one or more of a database 206A. Within the database 206A, the medical care organization 618 information is stored as medical care organization records 604, the healthcare facility information 402 is stored as a healthcare facility record 606, the patient information 102 is stored as a patient record 608, the physician information 802 is stored as a physician record 610, and the medical readings 220 are stored as medical reading records 612.

Physicians 802 can monitor their patient's 102 medical readings and progress towards wellness goals 302A-E by accessing through the present invention patient records 608, medical reading records 612, and other data that can be analyzed or otherwise displayed. The physician 802 can also make additions and changes to the data as allowed by their access level and in accordance with healthcare privacy rules, regulations, and laws.

Healthcare facilities 402 can monitor patient 102 progress as well as the physician's 802 progress with their patients 102 towards meeting wellness goals 302A-E by accessing through the present invention patient records 608, physician records 610, medical reading records 612, and other data that can be analyzed or otherwise displayed. The healthcare facility 402 can also make additions and changes to the data as allowed by their access level and in accordance with healthcare privacy rules, regulations, and laws.

Managed care organizations can monitor and be monitored by healthcare evaluators or administrators 502. The healthcare evaluators or administrators 502 can monitor patient 102 progress as well as the physician's 802 progress with their patients 102 towards meeting wellness goals 302A-E and more broadly evaluate progress towards wellness goals 302A-E for each of the healthcare facilities 402 assigned to the medical care organization 618. Such monitoring and evaluation by the healthcare evaluators or administrators 502 can be effectuated by accessing through the present invention patient record 608, physician records 610, healthcare facility records 606, medical care organization records 604, medical reading records 612, and other data that can be analyzed or otherwise displayed. The healthcare evaluators or administrators 502 can also make additions and changes to the data as allowed by their access level and in accordance with healthcare privacy rules, regulations, and laws.

In an exemplary embodiment, while data can be analyzed and reports provided at many levels including patient 102, physician 802, healthcare facility 402, and managed care organization 618, an advantage in the present invention is the ability to evaluate the progress of a managed care organization 618 based on 'percentage of goal' that is the percentage of the wellness goal obtained.

In the present invention, "percentage of goal" is the percentage of patient medical readings within a patient population that meet the wellness target medical reading. As an example, and not a limitation, a predetermined wellness goal can include a wellness area such as hypertension 302A, diabetes 302B, body weight or body mass index (BMI) 302C, cholesterol 302D, and/or other wellness areas 302D. Within each wellness area specificity around a target medical reading can be included. For example, related to hypertension, the target medical reading can be a blood pressure reading of less than 140 systolic over 90 diastolic. The wellness goal which can also be referred to as the percentage of wellness goal then becomes the percentage of the medical readings in the patient population that meet the target medical reading. For example, the desired percentage of goal can be that 70% of the medical readings meet the target medical reading of a blood pressure reading of less than 140 systolic over 90 diastolic. As an example, if there are 100 medical readings total in the patient population recordset 614 and 65 of the medical readings meet the target blood pressure reading of less than 140 systolic over 90 diastolic then the analysis is that the percentage of goal is 65%. In this case, since the desired percentage of goal was 70% and the actual percentage of goal was 65% it can be concluded that the patient population represented by the medical readings in the patient population recordset 614 didn't meet the desired percentage of goal.

For disclosure purposes, 'percentage of goal' can be referred to as a 'percentage of managed care organization goal' for patients 102 assigned to a managed care organization 618, 'percentage of healthcare facility goal' for patients 102 assigned to a healthcare facility 402, 'percentage of physician goal' for patients 102 assigned to a physician 802, and 'percentage of patient goal' for patients 102.

The percentage of wellness goal can be determined for one or more patients, a patient population assigned to a physician 802, a patient population assigned to a healthcare facility 402, or a patient population assigned to a managed care organization 618. In addition, a patient population segmentation rules 626 can be used to create a subset of the patient population to allow for segmentation of the data around criteria such as gender, race, ethnicity, age, healthcare facility, managed care organization, physician, medical reading date and timestamp ranges, type of wellness goal, patient zip code, and other criteria.

In an exemplary embodiment, for example, and not a limitation, often a managed care organization's 618 ability to get (or keep) funding from various sources is based on the managed care organization's ability to meet a 'percentage of goal' criteria. As an example, with regards to a hypertension wellness goal, 70% of the patient's medical readings 220 in the patient population associated with the managed care organization 618 need to meet the goal of less than 140 systolic over 90 diastolic of a defined time period.

An advantage in the present invention is that such quantitative and qualitative analysis can be performed and recommendations generated that can be used in evaluating the progress towards the managed care organization 618 meeting the percentage of goals target that support funding decisions and organizational management decisions that derive therefrom. In addition, quantitative and qualitative analysis can be performed and recommendations generated to help healthcare facilities 402 improve patient 102 outcomes, and physician 802 can act on patient insights learned from the data to improve patient care.

Turning now to the drawings in greater detail, it will be seen that in FIG. 1 there is illustrated one example of a network for evaluating the progress of a managed care organization's 618 patient 102 wellness goals. In an exemplary embodiment, users of the network can include patient 102, physicians 802, healthcare facility 402 authorized personnel, healthcare evaluators or administrators 502, and other authorized persons or agencies. Such healthcare evaluators or administrators 502 can be associated with a managed care organization 618 or other authorized agency or user group, as may be required and/or desired in a particular embodiment.

Each of the users uses computing devices to data communicate over a global communication network 210 with one or more data processing resources 202. The computing device can be laptop computers, desktop computers, smartphones, tablets, or other types and kinds of computing devices, as may be required and/or desired in a particular embodiment. For disclosure purposes, computing devices can be referred to as computing devices 212. Additionally, laptop and desktop types of computing devices 212 can be referred to as computing devices 212A and smartphone and tablet types of computing devices 212 can be referred to as computing devices 212B. The global communication network 210 can be the Internet.

The computing devices 212 can comprise a microprocessor 204B, a database 206B, memory 208B, a communication interface 210B, a display 230, and a plurality of general-purpose inputs and outputs (GPIO) 214. The microprocessor 204B is operationally related to database 206B, memory 208B, communication interface 210B, display 230, and GPIO 214.

The microcontroller 204B can be INTEL, ZILOG, MICROCHIP, AMD, ARM, and/or other types or kinds of microprocessors.

The database 206B can be SQL, MYSQL, MARIADB, ORACLE, MS ACCESS, network accessible storage, flat files, a combination thereof, or other types and kinds of databases.

The memory 208B can be combinations of RAM, ROM, flash, hard drives, solid-state drives, USB flash drives, micro-SD cards or other types of removable memory, and/or other types and kinds of memory.

The communication interfaces 210B can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The display 230 can be a liquid crystal display (LCD), light emitting diode (LED), organic light emitting diode (OLED), or other types and kinds of displays.

The GPIO 214 can be TTL, CMOS, MOSFET, transistors, buffers, relays, pushbutton, switch, and/or other types and kinds of GPIO circuits. In an exemplary embodiment, some of the GPIO 214 lines can be used to drive a touch screen input, biometric input devices, keyboards, and or types and kinds of computing device input devices.

The data processing resource 202 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 202 can also be referred to as server 202.

The data processing resource 202 can comprise a microprocessor 204A, a database 206A, memory 208A, and a communication interface 210A. The microprocessor 204A is operationally related to database 206A, memory 208A, and communication interface 210A.

The microcontroller 204A can be INTEL, ZILOG, MICROCHIP, AMD, ARM, and/or other types or kinds of microprocessors.

The database 206A can be SQL, MYSQL, MARIADB, ORACLE, MS ACCESS, network accessible storage, flat files, a combination thereof, or other types and kinds of databases.

The memory 208A can be a combination of RAM, ROM, flash, hard drives, solid-state drives, USB flash drives, micro-SD cards or other types of removable memory, and/or other types and kinds of memory.

The communication interfaces 210A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, a plurality of different medical monitoring devices 302 can be used by the patient 102 to make self-reported medical readings 220. In this regard, in accordance with which wellness area the patient 102 is pursuing such as hypertension 302A, diabetes 302B, Weight or BMI management 302C, cholesterol 302D, or other wellness goals 302E the patient 102 can use the appropriate medical reading device 302 and make self-reported medical readings 220 over a time period such as hourly, daily, weekly, monthly, or other time periods. Patient 102 can work with healthcare facility 402 and optionally a physician 802. Healthcare facility 402 is part of a managed care organization 618.

To accommodate a plurality of wellness areas, and support a wide variety of medical monitoring devices 302A-E, an advantage in the present invention is how the network and data communications with the variety of different medical monitoring devices 302-E switch 216 operation and thus the collecting of a plurality of different types of medical readings 220 can be effectuated with the remote data processing resource 202 in a number of different ways.

A first network configuration and data communication alternative is where the medical monitoring devices 302A-E are capable of data communicating 224/222 directly with the remote data processing resource 202.

A second network configuration and data communication alternative is where the medical monitoring device 302A-E can data communicate 218, such as a Bluetooth connection or other, to a personal computing device 212B such as a smartphone, or other personal computing devices that is proximate to the patient 102, and the medical monitoring device 302A-E. The personal computing device 212B can then data communicate 228/222 the medical readings 220 to the remote data processing resource.

A third data network configuration and communication alternative is where the medical monitoring device 102 plugs into the patient's 102 computing device 212A and data communicates 226/222 by way of the patient's 102 computing device with the remote data processing resource 202.

In an exemplary embodiment, the first, second, and third alternatives are preferred. In this regard, the patient is responsible for performing the medical reading 220 but not responsible for data entry. That being said, a fourth network configuration and data communication alternative is where the patient 102 enters the medical reading 220 or symptoms manually on a computing device 212A or 212B where it is posted or otherwise data communicated 222 to the remote data processing resource 202.

An advantage, in the present invention, is by accommodating many different medical monitoring devices 302A-E and being able to interchangeably switch 216 between many different network configurations and data communication 218/222/224/226/228 alternatives, patient 102 has greater flexibility to make medical readings 220 while at home, at work, while traveling, and in other situations.

In an exemplary embodiment, a system for evaluating the progress of a managed care organization's patient wellness goals using a segmented patient population and patient self-reported medical readings can comprise one or more of a server 202. The server 202 can comprise a microprocessor 204A, and a memory 208A.

The system comprises at least one computing device 212 that a healthcare evaluator 502 or other authorized users 102/402/502/802 use to data communicate with the server 202.

A medical monitoring device 302A-E can be distributed to each of more than one patient 102. The medical monitoring device 302A-E can be used by patient 102 to effectuate measuring more than one medical reading 220 repeatedly over a time period. A patient identifier and the medical reading can be data communicated to server 202 by way of the medical monitoring device 302A-E or by way of a personal computing device 212B that is proximate to the patient 102 that data communicates with the medical monitoring device 302A-E and the server 202.

In operation, the memory 208A is encoded with instructions that when executed by the microprocessor 204A perform the steps of defining a predetermined wellness goal, and creating, by way of server 202, a patient record 608 for at least one patient 102. The patient record 608 comprises a patient identifier.

The steps continue by creating, by server 202, a healthcare facility record 606 for one or more healthcare facility 402. The healthcare facility record 606 comprises a healthcare facility identifier and the patient identifier of each patient 102 who is receiving treatment at the healthcare facility 402. By server 202, a managed care organization record 604 is created that comprises the healthcare facility identifier for each healthcare facility 402 associated with a managed care organization 618. By server 202, a medical reading record 612 is created for each of the medical reading 220 received. The medical reading record 612 comprises a medical reading identifier, the patient identifier, the healthcare facility identifier associated with the patient identifier, the medical reading, and a date and a timestamp that indicates when the medical reading 220 was taken.

The steps continue by determining, by the server 202, a patient population recordset 614 that comprises each of the medical reading identifiers returned in a query of one or more of a patient population segmentation rule 626 from a plurality of the medical reading record 612 that are associated with one or more of the patient identifier that is associated with one or more of the healthcare facility identifier that is associated with the managed care organization record 604.

The server 202 then calculates each the following for each unique one of the patient identifier in the patient population recordset 608 a 'percentage of patient goal' based on the predetermined wellness goal is determined, for each unique one of the healthcare facility identifier in the patient population recordset 608 'a percentage of healthcare facility goal' based on the predetermined wellness goal is determined, and for all the records in the patient population recordset 'a percentage of managed care organization goal' based on the predetermined wellness goal is determined.

Received plurality of a display data from server 202 is then displayed on the computing device 212. The display data is accessible to the healthcare evaluator 502 or other authorized users 102/402/502/802. The display data are related to at least one of the following: one or more of the patient record 608 and the 'percentage of patient goal' based on the predetermined wellness goal that the patient record 608 is associated with, one or more of the healthcare facility record 606 and the 'percentage of healthcare facility goal' based on the predetermined wellness goal that the healthcare facility record 606 is associated with, and the 'percentage of managed care organization goal' based on the predetermined wellness goal.

Figure 2:
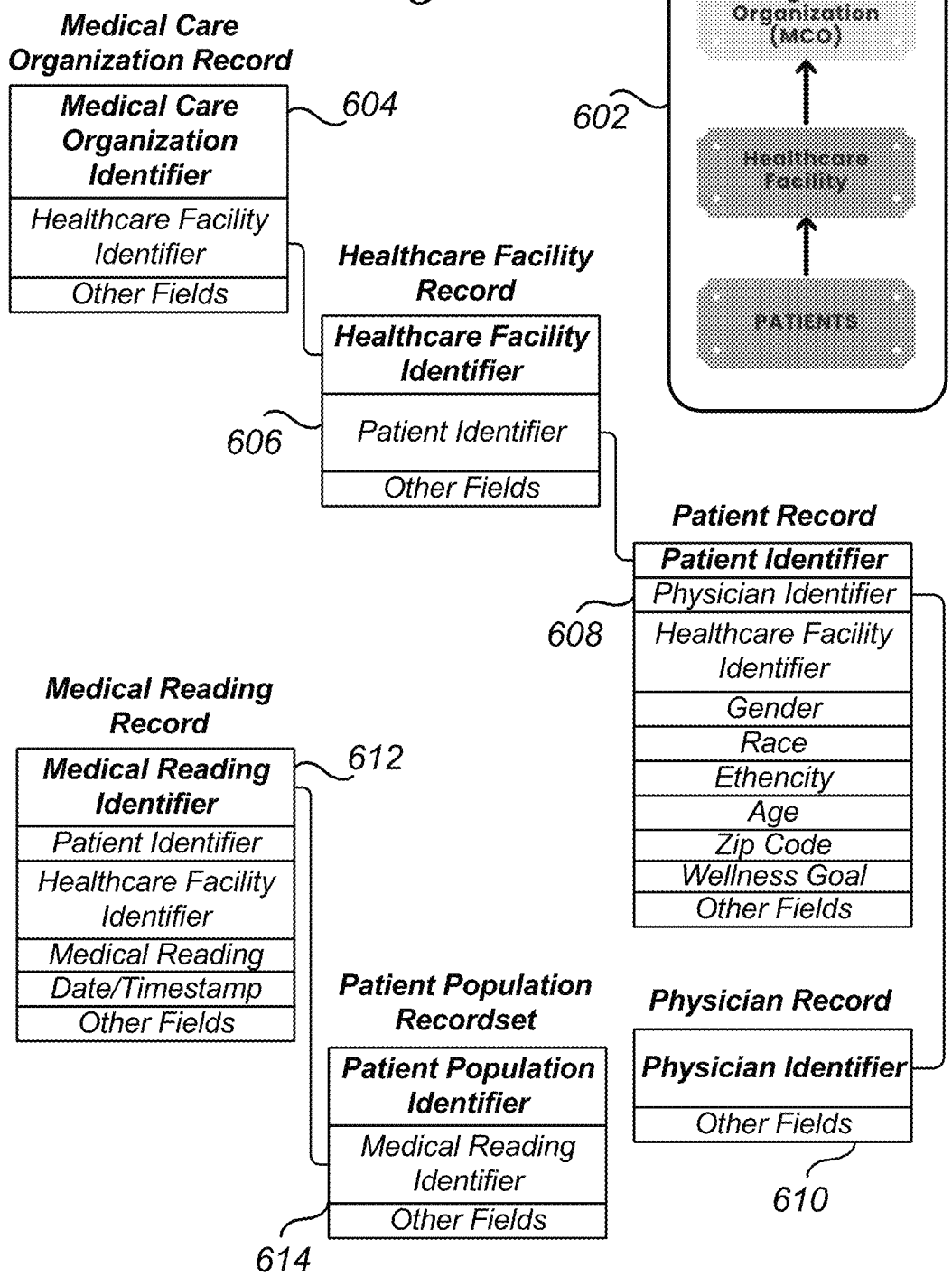
FIG. 2 illustrates one example of organizing data related to evaluating the progress of a managed care organization's patient wellness goals.

Referring to FIG. 2, there is illustrated one example of organizing data related to evaluating the progress of a managed care organization's patient wellness goals. In the present invention, in an exemplary embodiment, the data structure is hierarchical in nature 602. In this regard, the database 206A can organize data where patient 102 information is stored in patient records 608 that informs healthcare facility 402 information that is stored in healthcare facility records 606 where patient records can be associated, that informs medical care organization 618 information that is stored in medical care organization records 604 where healthcare facility records can be associated. The database 206A can be SQL, MYSQL, MARIADB, ORACLE, MS ACCESS, network accessible storage, flat files, a combination thereof, or other types and kinds of databases. Additionally, the database 206A can reside in more than one remote data processing resource 202 including on a computing device 212/212A-B as database 206B. Such database 206A and the data therein can be secured as necessary and managed, maintained, and data siloed in compliance with applicable healthcare requirements, regulations, laws, or otherwise.

In operation, patient 102 can be added to a patient record 608 table. In an exemplary embodiment, the patient record 608 tables can comprise a number of fields including a patient identifier which is unique and can be used to reference the patient information in other database tables. The patient record 608 table can also comprise fields such as a physician identifier that is the physician 802 the patient is assigned to, and a healthcare facility identifier indicating the healthcare facility 402 that the patient 102 is associated with. The patient record 608 table can also comprise fields such as the patient's gender, race, ethnicity, age, zip code, wellness goal they are pursuing, and other fields, as may be required and/or desired in a particular embodiment.

Healthcare facilities 402 can be added to a healthcare facility record 606 table. In an exemplary embodiment, the healthcare facility record 606 table can comprise a number of fields including a healthcare facility identifier which is unique and can be used to reference the healthcare facility information in other database tables. The healthcare facility record 606 table can also comprise a field for a patient identifier that assigns the patient 102 to the healthcare facility 402, and other fields as may be required and/or desired in a particular embodiment.

Medical care organizations 618 can be added to a medical care organization record 606 table. In an exemplary embodiment, the medical care organization record 606 table can comprise a number of fields including a medical care organization identifier which is unique and can be used to reference the medical care organization information in other database tables. The medical care organization record 604 table can also comprise a field for a healthcare facility identifier that assigns the healthcare facility 402 to the medical care organization 618, and other fields as may be required and/or desired in a particular embodiment.

Physicians 802 can be added to a physician record 610 table. In an exemplary embodiment, the physician record 610 table can comprise a number of fields including a physician identifier which is unique and can be used to reference the physician information in other database tables. The physician record 610 table can also comprise other fields as may be required and/or desired in a particular embodiment.

In an exemplary embodiment, each time medical reading 220 is received at the data processing resources 202, the medical reading 220 can be stored in the medical reading record 612 table. The medical reading record 612 can comprise a number of fields including a medical reading identifier which is unique and can be used to reference the medical reading information in other database tables. The medical reading record 612 table can also comprise fields such as the patient identifier associated with the medical reading 220, the healthcare facility identifier, the medical reading 220, a date and timestamp when the medical reading was received, and other fields, as may be required and/or desired in a particular embodiment. In operation, each medical reading 220 received creates a unique entry in the medical readings record 612 table.

In an exemplary embodiment, the user of the present invention can tailor a patient population segmentation rule 626 to be used as a query string or query strings to create a patient population recordset 614. The patient population recordset can comprise a number of fields including a patient population identifier which is unique and can be used to reference the patient population information in other database tables. The patient population record 614 table can also comprise fields such as the medical reading identifier associated with the medical reading 220, and other fields, as may be required and/or desired in a particular embodiment.

In operation, once queried the patient population recordset 614 can be used to perform data analysis at many levels including the managed care organization 618, the healthcare facility 402, the physician 802, the patient 102, a combination thereof, and perform other types and kinds of data analysis based in part of the patient 102 medical readings 220, as may be required and/or desired in a particular embodiment.

Referring to FIG. 3, there is illustrated one example of how the progress of a managed care organization's patient wellness goals is evaluated. In an exemplary embodiment, in reference 'A', a hierarchical data and organization structure is formed where self-reported medical readings 220A-H are associated with patients 120A-D. As an example, one medical monitoring device 302A-E is assigned to patient 102A. Patient 102A then proceeds to take and self-report medical readings 220A-B over a time period. The same is true for patients 102B, 102C, and 102D.

Patients 102A-D are assigned to a healthcare facility 402A-B. And one or more healthcare facility 402A-B is assigned to a managed care organization 618.

In operation, a managed care organization record 604 is created for each managed care organization 618, a healthcare facility record 606 is created for each healthcare facility 402, a patient record is 608 is created for each patient 102, and a medical reading record 610 is created for each medical reading 220 submitted. The proper data hierarchy is created such that the medical readings 220 associated with each patient 102 can be analyzed, the medical readings 220 associated with each healthcare facility 402 can be analyzed, and the medical readings 220 associated with each managed care organization 618 can be analyzed.

In reference 'B', when the data and organizational hierarchical structure is complete self-reported medical readings 220 from patients are constantly data communicated to the remote data processing resource 212 over a time period where they are associated with the patient and added to the medical reading record 612 table in the database 206A.

In operation, an authorized user such as 102/402/502/802 can use a computing device 212 including a personal computing device 212B by way of the global communication network 210 to access the systems, methods, and network of the present invention. Such authorized users can be a healthcare evaluator or administrator 502, a healthcare facility 402 users, a physician 802, a patient 102, or other authorized users. Each authorized user is limited appropriately based on their user level and data is siloed to protect against sharing between parties where needed and in accordance with applicable rules, regulations, and laws. As an example, patient 102 can see their own data within the software application. Physicians 802 can see their own data and their patient's data including the patient's medical reading records 612. Healthcare facilities 402 can see their own data, their physician's data (as appropriate), their patient's data (as appropriate), and the medical reading records 612 associated with the patients assigned to the healthcare facility 402. Managed care organization 618 can see their healthcare facilities 402 data (as appropriate), their physician 802 data (as appropriate), their patient 102 data (as appropriate), and the medical reading records 612 associated with the patient's assigned to the managed care organization 618.

In reference 'B', once a user accesses the systems, methods, and network of the present invention the user can segment the patient population 628 to create a patient population recordset that can be analyzed. In this regard, the user 102/402/502/802 can select patient population segmentation criteria to subdivide the patient population and associated readings that are available under their user level to access. In this regard, a patient population segmentation rules 626 can be used as a query string to create a subset of the patient population. Such segmentation criteria can include gender, race, ethnicity, age, the physician assigned to the patient, wellness goal, patient zip code, and/or other criteria. The segmentation criteria can also include healthcare facility, managed care organization, the medical reading date and timestamp ranges, and other criteria, as may be required and/or desired in a particular embodiment.

In operation, once the patient population segmentation rule is defined it can be used to query a patient population recordset 614 that comprises the medical reading identifier for each patient 102 medical readings within the segmented patient population that their user level allows access to. In an exemplary embodiment, the details in the patient population recordset 614 should be sufficient to access the medical records 612, associated patient information and records 608, associated physician information and records 610, associated healthcare facility information and records 606, associated managed care organization information and records 604, and other required information in accordance with the users access level.

In an exemplary embodiment, in reference 'C', once the patient population recordset 614 is created evaluation of the progress of patient wellness goal 630 can proceed with data processing analysis.

For example, and not a limitation, at the managed care organization 618 level, such data processing analysis involved in evaluating the progress of patient wellness goals includes calculating for all the records in the patient population recordset 614 a percentage of managed care organization goal based on a predetermined wellness goal. Such results and display data can be data communicated by server 202 to the user's computing device and displayed as illustrated in at least FIG. 7, 702. In addition, other types and kinds of data analysis can be effectuated and displayed, as may be required and/or desired in a particular embodiment.

In this regard, the percentage of wellness goal is the percentage of patient medical readings within a patient population that meet the predetermined wellness goal. As an example, the desired percentage of goal is that 70% of the medical readings meet the target medical reading of a blood pressure reading of less than 140 systolic over 90 diastolic. In operation, if there are 100 medical readings total in the patient population and 73 of the medical readings meet the target blood pressure reading of less than 140 systolic over 90 diastolic then the analysis is that the percentage of goal is 73%. In this case, since the desired percentage of goal was 70% and the actual percentage of goal was 73% it can be concluded that the patient population recordset 614 represented by the medical readings in the patient population recordset 614 exceed the desired percentage of goal.

Similarly, at the healthcare facility 402 level, such data processing analysis involved in evaluating the progress of patient wellness goals includes calculating for each unique healthcare facility identifier using the associated medical records in the patient population recordset 614 a percentage of healthcare facility goal based on a predetermined wellness goal. Such results and display data can be data communicated by server 202 to the user's computing device and displayed as illustrated in at least FIG. 8, 704. In addition, other types and kinds of data analysis can be effectuated and displayed, as may be required and/or in a particular embodiment.

Similarly, at the patient 102 level, such data processing analysis involved in evaluating the progress of patient wellness goals includes calculating for each unique patient identifier using the associated medical records in the patient population recordset 614 a percentage of patient goal based on a predetermined wellness goal. Such results and display data can be data communicated by server 202 to the user's computing device and displayed as illustrated in at least FIG. 10, 706. In addition, other types and kinds of data analysis can be effectuated and displayed, as may be required and/or in a particular embodiment.

Figure 4A:
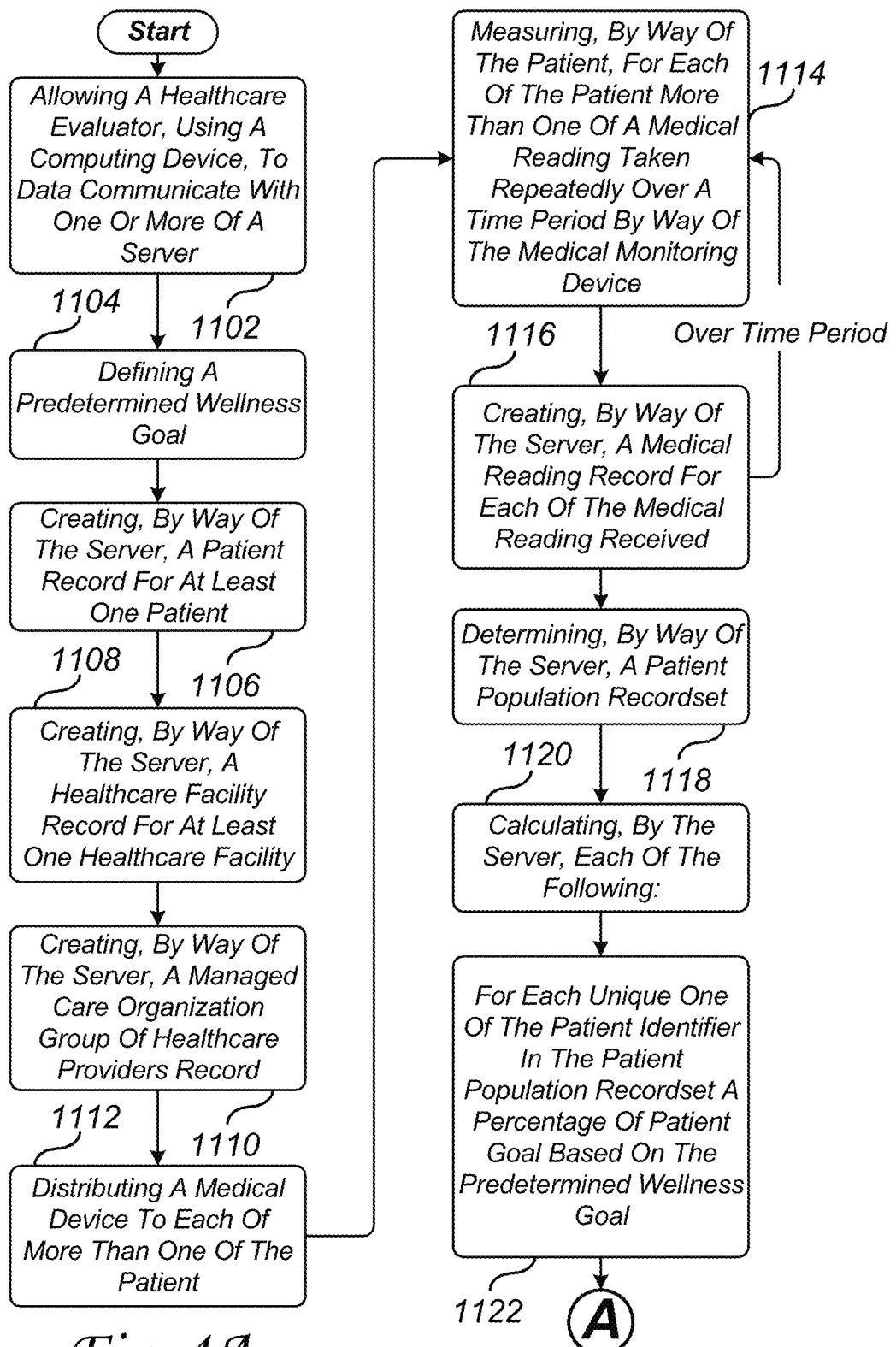
FIGS. 4A-4B and 5A-5B illustrate examples of a method of evaluating the progress of a managed care organization's patient wellness goals using a segmented patient population and patient self-reported medical readings.
Figure 4B:
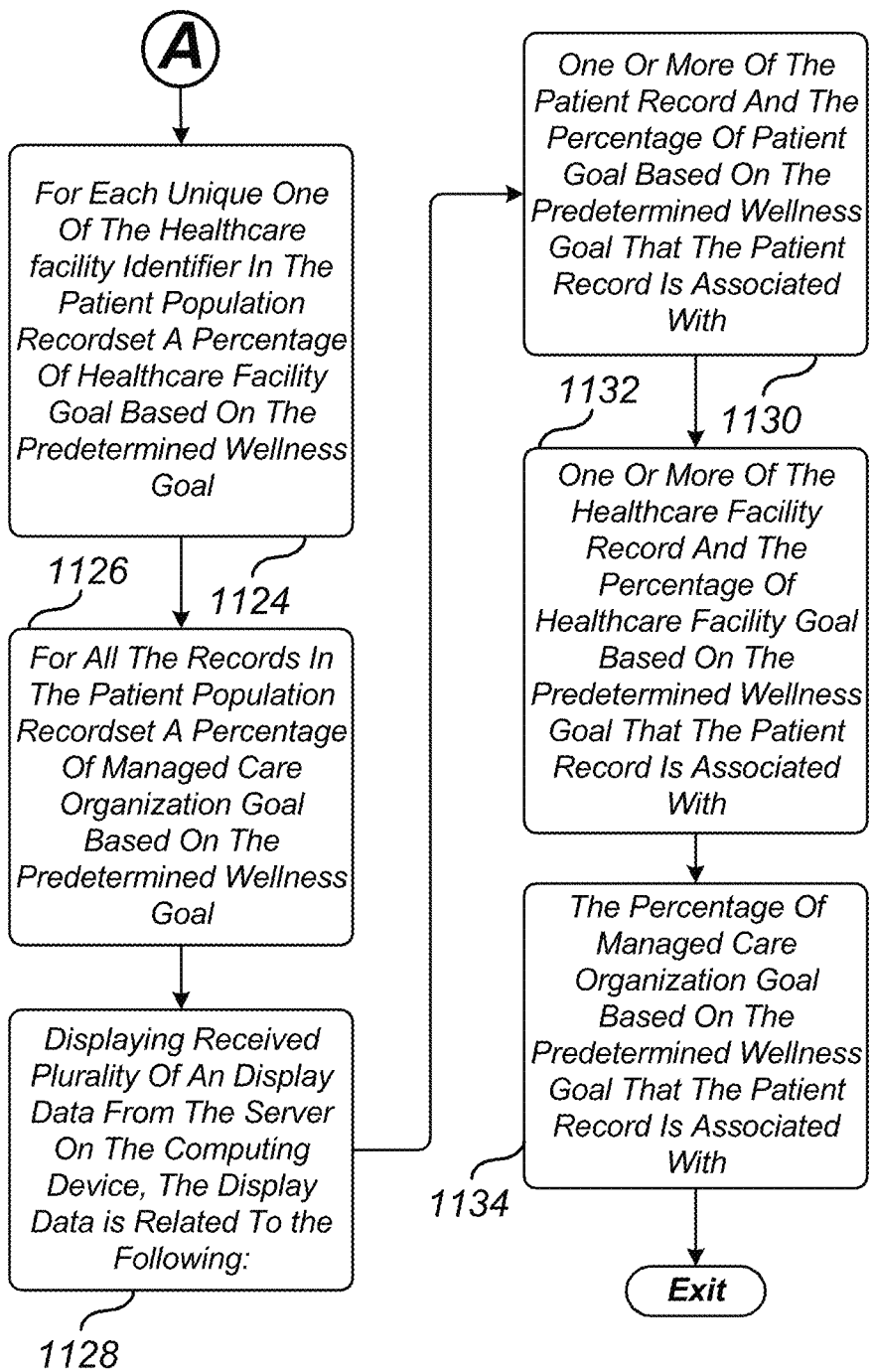

Referring to FIGS. 4A-4B, there is illustrated one example of a method of evaluating the progress of a managed care organization's patient wellness goals using a segmented patient population and patient self-reported medical readings. In an exemplary embodiment, and with reference to FIG. 4A, the method begins in step 1102.

In step 1102, a healthcare evaluator 502 is allowed to data communicate with one or more of a server 202 using a computing device 212. Such a healthcare evaluator or administrator 502 can be an authorized person associated with the managed care organization 618 or a user who is independent of the managed care organization 618 but authorized to have access to the managed care organization 618 information and evaluate the progress of the managed care organization's 618 patient wellness goals.

In a plurality of other exemplary embodiments, patients 102, healthcare facilities 402 users, physicians 802, and patient 102 can use the systems, methods, and network of the present invention to perform other kinds of data analysis specifics to them and the data can be secured and/or otherwise firewalled or siloed allowing certain data to be seen and/or used based on the user's authorization level. The method then moves to step 1104.

In step 1104, a predetermined wellness goal can be defined. In an exemplary embodiment, a predetermined wellness goal can include a wellness area such as hypertension 302A, diabetes 302B, body weight or body mass index (BMI) 302C, cholesterol 302D, and/or other wellness areas 302D. Within each wellness area specificity around a target medical reading 220 can be included or otherwise defined. For example, related to hypertension, the target medical reading 220 can be a blood pressure reading of less than 140 systolic over 90 diastolic. The wellness goal which can also be referred to as a percentage of wellness goal or percentage of goal can then be determined as the percentage of the medical readings 220 in the patient population recordset 628 that meet the target medical reading. For example, the desired percentage of goal can be that 70% of the medical readings meet the target of a blood pressure reading of less than 140 systolic over 90 diastolic. As an example, if there are 100 medical readings total in the patient population recordset 628 and 75 of the medical readings meet the target blood pressure reading of less than 140 systolic over 90 diastolic then the analysis is that the percentage of goal is 75%. In this case, since the desired percentage of goal was 70% and the actual percentage of goal was 75% it can be concluded that the patient population recordset 614 represented by the medical readings in the patient population recordset 614 exceeded the desired percentage of goal. The method then moves to step 1106.

In step 1106, by server 202, a patient record 608 can be created for at least one patient 102. The patient record 608 can comprise a patient identifier. The patient record 608 table can comprise a number of fields including the patient identifier which is unique and can be used to reference the patient information in other database tables. The method then moves to step 1108.

In step 1108, by server 202, a healthcare facility record 606 can be created for one or more of a healthcare facility 402. The healthcare facility record 606 comprises a healthcare facility identifier and the patient identifier of each patient 102 who is receiving treatment at the healthcare facility 402. The healthcare facility record 606 table can comprise a number of fields including a healthcare facility identifier which is unique and can be used to reference the healthcare facility 402 information in other database tables. The method then moves to step 1110.

In step 1110, by server 202, a managed care organization record 604 is created that comprises the healthcare facility identifier for each healthcare facility 402 associated with a managed care organization 618. The medical care organization record 606 table can comprise a number of fields including a medical care organization identifier which is unique and can be used to reference the medical care organization 618 information in other database tables. The method then moves to step 1112.

In step 1112, a medical monitoring device 302A-E is distributed to each of more than one patient 102. In this regard, depending on the patient's wellness goal the appropriate medical monitoring device can be distributed to the patient. Distributed can mean provided, rented, bought, loaned, or otherwise used by the patient 102. In an exemplary embodiment, each patient 102, in the patient population, has access to their own medical monitoring device, or a centrally located medical monitoring device is provided that the patient population can use.

Such medical monitoring devices can be blood pressure monitor device 302A for hypertension wellness goals, a glucose monitoring device 302B for diabetes wellness goals, a scale 302C for weight and/or BMI wellness goals, blood testing device 302D for cholesterol wellness goals, and other type and kinds of medical monitoring devices 302E for other wellness goals. The method then moves to step 1114.

In step 1114, by way of patient 102, for each of the patients more than one medical reading 220 can be measured repeatedly over a time period by way of the medical monitoring device 302A-E. For each of the medical readings 220 the patient identifier, and the medical reading are data communicated to server 202. The method then moves to step 1116.

In step 1116, by server 202, a medical reading record 612 is created for each of the medical reading 220 received. The medical reading record 612 comprises a medical reading identifier, the patient identifier, the healthcare facility identifier associated with the patient identifier, the medical reading 220, and date and timestamp that indicates when the medical reading was taken or alternatively received by the server 212. The method then moves to step 1118.

In step 1118, by the server 202, a patient population recordset 614 is determined that comprises each of the medical reading identifiers returned in a query of one or more patient population segmentation rule 626 from the plurality of the medical reading record 612 that is associated with one or more patient identifier that is associated with one or more healthcare facility identifier that is associated with the managed care organization record 604.

In operation, a patient population segmentation rules 626 can be used to create a subset of the patient population to allow for segmentation of the data around criteria such as gender, race, ethnicity, age, healthcare facility, managed care organization, physician, medical reading date and timestamp ranges, type of wellness goal, patient zip code, and other criteria. The method then moves to step 1120.

In step 1120, by the server, analysis and calculations are made in steps 1122, 1124, and 1126 as follows. In step 1122, for each unique patient identifier in the patient population recordset 614 a 'percentage of patient goal' based on the predetermined wellness goal is determined. The percentage of patient goal is the percentage of the medical readings 220 in the patient population recordset 628 that met the target medical reading for a single patient 102 and the determination can be made for each patient 102 individually in the patient population recordset 614. The method then moves to step 1124.

In step 1124, and with reference to FIG. 4B, for each unique one of the healthcare facility identifier in the patient population recordset a 'percentage of healthcare facility goal' based on the predetermined wellness goal is determined. The percentage of healthcare facility goal is the percentage of the medical readings 220 in the patient population recordset 628 for the patients that are assigned to the healthcare facility 402 who met the target medical reading for a healthcare facility 402 and the determination can be made for each healthcare facility 402 individually in the patient population recordset 614. The method then moves to step 1126.

In step 1126, for all the records in the patient population recordset a 'percentage of managed care organization goal' based on the predetermined wellness goal is determined. The percentage of managed care organization goal is the percentage of the medical readings 220 in the patient population recordset 628 for each healthcare facility 402 that is assigned to the managed care organization 618 that met the target medical reading. The method then moves to step 1128.

In step 1128, the received plurality of display data from server 202 is displayed on the computing device 212, the display data are accessible to the healthcare evaluator or other authorized users. The display data are related to at least one of the following steps 1130, 1132, and 1134:

In step 1130, one or more patients record 608, and the percentage of patient goal, based on the predetermined wellness goal that the patient record 608 is associated with.

In step 1132, one or more healthcare facility record 606, and the percentage of healthcare facility goal, based on the predetermined wellness goal that the healthcare facility record 606 is associated with.

In step 1134, the percentage of managed care organization goal based on the predetermined wellness goal. The method is then exited.

Figure 5A:
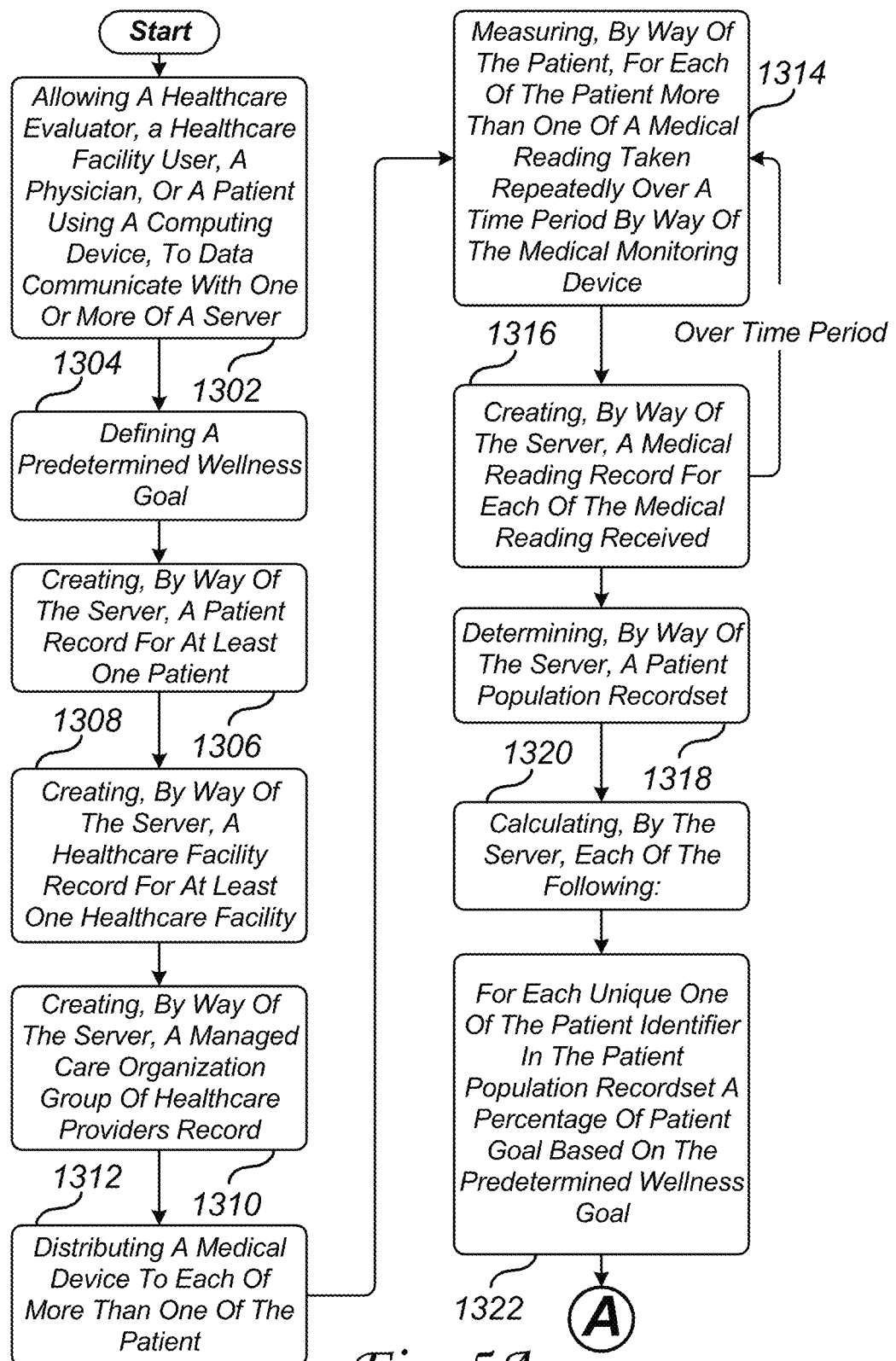
Figure 5B:
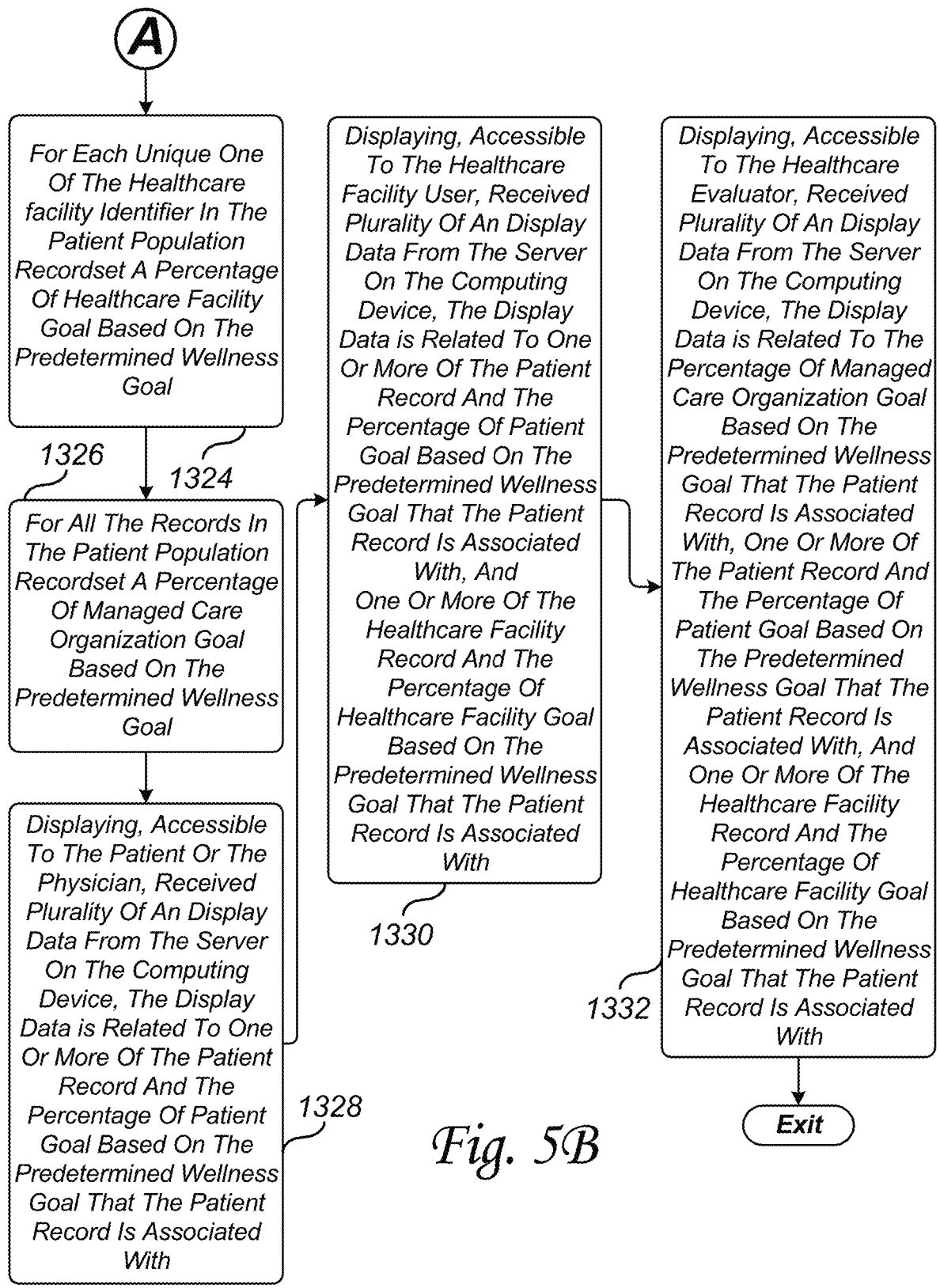

Referring to FIGS. 5A-5B, there is illustrated one example of a method of evaluating the progress of a managed care organization's patient wellness goals using a segmented patient population and patient self-reported medical readings. In an exemplary embodiment, and with reference to FIG. 5A, the method begins in step 1302.

In step 1302, a healthcare evaluator 502, a healthcare facility 402 user, a physician 802, or a patient 102 is allowed to data communicate with one or more of a server 202 using a computing device 212. Such a healthcare evaluator or administrator 502 can be an authorized person associated with the managed care organization 618 or a user who is independent of the managed care organization 618 but authorized to have access to the managed care organization 618 information and evaluate the progress of the managed care organization's 618 patient wellness goals. The method then moves to step 1304.

In step 1304, a predetermined wellness goal can be defined. In an exemplary embodiment, a predetermined wellness goal can include a wellness area such as hypertension 302A, diabetes 302B, body weight or body mass index (BMI) 302C, cholesterol 302D, and/or other wellness areas 302D. Within each wellness area specificity around a target medical reading 220 can be included or otherwise defined. For example, related to hypertension, the target medical reading 220 can be a blood pressure reading of less than 140 systolic over 90 diastolic. The wellness goal which can also be referred to as a percentage of wellness goal or percentage of goal can then be determined as the percentage of the medical readings 220 in the patient population recordset 628 that meet the target medical reading. For example, the desired percentage of goal can be that 70% of the medical readings meet the target of a blood pressure reading of less than 140 systolic over 90 diastolic. As an example, if there are 100 medical readings total in the patient population recordset 628 and 75 of the medical readings meet the target blood pressure reading of less than 140 systolic over 90 diastolic then the analysis is that the percentage of goal is 75%. In this case, since the desired percentage of goal was 70% and the actual percentage of goal was 75% it can be concluded that the patient population recordset 614 represented by the medical readings in the patient population recordset 614 exceeded the desired percentage of goal. The method then moves to step 1306.

In step 1306, by server 202, a patient record 608 can be created for at least one patient 102. The patient record 608 can comprise a patient identifier. The patient record 608 table can comprise a number of fields including the patient identifier which is unique and can be used to reference the patient information in other database tables. The method then moves to step 1308.

In step 1308, by server 202, a healthcare facility record 606 can be created for one or more of a healthcare facility 402. The healthcare facility record 606 comprises a healthcare facility identifier and the patient identifier of each patient 102 who is receiving treatment at the healthcare facility 402. The healthcare facility record 606 table can comprise a number of fields including a healthcare facility identifier which is unique and can be used to reference the healthcare facility 402 information in other database tables. The method then moves to step 1310.

In step 1310, by server 202, a managed care organization record 604 is created that comprises the healthcare facility identifier for each healthcare facility 402 associated with a managed care organization 618. The medical care organization record 606 table can comprise a number of fields including a medical care organization identifier which is unique and can be used to reference the medical care organization 618 information in other database tables. The method then moves to step 1312.

In step 1312, a medical monitoring device 302A-E is distributed to each of more than one patient 102. In this regard, depending on the patient's wellness goal the appropriate medical monitoring device can be distributed to the patient. Distributed can mean provided, rented, bought, loaned, or otherwise used by the patient 102. In an exemplary embodiment, each patient 102 in the patient population has access to their own medical monitoring device, or a centrally located medical monitoring device is provided that the patient population can use.

Such medical monitoring devices can be blood pressure monitor device 302A for hypertension wellness goals, a glucose monitoring device 302B for diabetes wellness goals, a scale 302C for weight and/or BMI wellness goals, blood testing device 302D for cholesterol wellness goals, and other type and kinds of medical monitoring devices 302E for other wellness goals. The method then moves to step 1314.

In step 1314, by way of patient 102, for each of the patients more than one medical reading 220 can be measured repeatedly over a time period by way of the medical monitoring device 302A-E. For each of the medical readings 220 the patient identifier, and the medical reading are data communicated to server 202. The method then moves to step 1316.

In step 1316, by server 202, a medical reading record 612 is created for each of the medical reading 220 received. The medical reading record 612 comprises a medical reading identifier, the patient identifier, the healthcare facility identifier associated with the patient identifier, the medical reading 220, and date and timestamp that indicates when the medical reading was taken or alternatively received by the server 212. The method then moves to step 1318.

In step 1318, by the server 202, a patient population recordset 614 is determined that comprises each of the medical reading identifiers returned in a query of one or more patient population segmentation rule 626 from the plurality of the medical reading record 612 that is associated with one or more patient identifier that is associated with one or more healthcare facility identifier that is associated with the managed care organization record 604.

In operation, a patient population segmentation rules 626 can be used to create a subset of the patient population to allow for segmentation of the data around criteria such as gender, race, ethnicity, age, healthcare facility, managed care organization, physician, medical reading date and timestamp ranges, type of wellness goal, patient zip code, and other criteria. The method then moves to step 1320.

In step 1320, by the server, analysis and calculations are made in steps 1322, 1324, and 1326 as follows. In step 1322, for each unique patient identifier in the patient population recordset 614 a 'percentage of patient goal' based on the predetermined wellness goal is determined. The percentage of patient goal is the percentage of the medical readings 220 in the patient population recordset 628 that met the target medical reading for a single patient 102 and the determination can be made for each patient 102 individually in the patient population recordset 614. The method then moves to step 1324.

In step 1324, and with reference to FIG. 4B, for each unique one of the healthcare facility identifier in the patient population recordset a 'percentage of healthcare facility goal' based on the predetermined wellness goal is determined. The percentage of healthcare facility goal is the percentage of the medical readings 220 in the patient population recordset 628 for the patients that are assigned to the healthcare facility 402 who met the target medical reading for a healthcare facility 402 and the determination can be made for each healthcare facility 402 individually in the patient population recordset 614. The method then moves to step 1326.

In step 1326, for all the records in the patient population recordset a 'percentage of managed care organization goal' based on the predetermined wellness goal is determined. The percentage of managed care organization goal is the percentage of the medical readings 220 in the patient population recordset 628 for each healthcare facility 402 that is assigned to the managed care organization 618 that met the target medical reading. The method then moves to step 1328.

In step 1328, accessible to patient 102 or physician 802, the received plurality of display data from server 202 is displayed on the computing device 212. The display data are related to one or more of the patient record 608 and the percentage of patient goal based on the predetermined wellness goal that the patient record 608 is associated with. The method then moves to step 1330.

In step 1330, accessible to the healthcare facility 402 users, the received plurality of a display data from the server 202 is displayed on the computing device 212. The display data are related to one or more of the patient record 608 and the percentage of patient goal based on the predetermined wellness goal that the patient record 608 is associated with, and one or more of the healthcare facility record 606 and the percentage of healthcare facility goal based on the predetermined wellness goal that the healthcare facility record 606 is associated with. The method then moves to step 1332.

In step 1332, accessible to the healthcare evaluator or other authorized users 502, the received plurality of display data from server 202 is displayed on the computing device 212. The display data are related to the percentage of managed care organization goal based on the predetermined wellness goal, one or more of the patient record 608 and the percentage of patient goal based on the predetermined wellness goal that the patient record 608 is associated with, and one or more of the healthcare facility record 606 and the percentage of healthcare facility goal based on the predetermined wellness goal that the healthcare facility record 606 is associated with. The method is then exited.

Figure 6A:
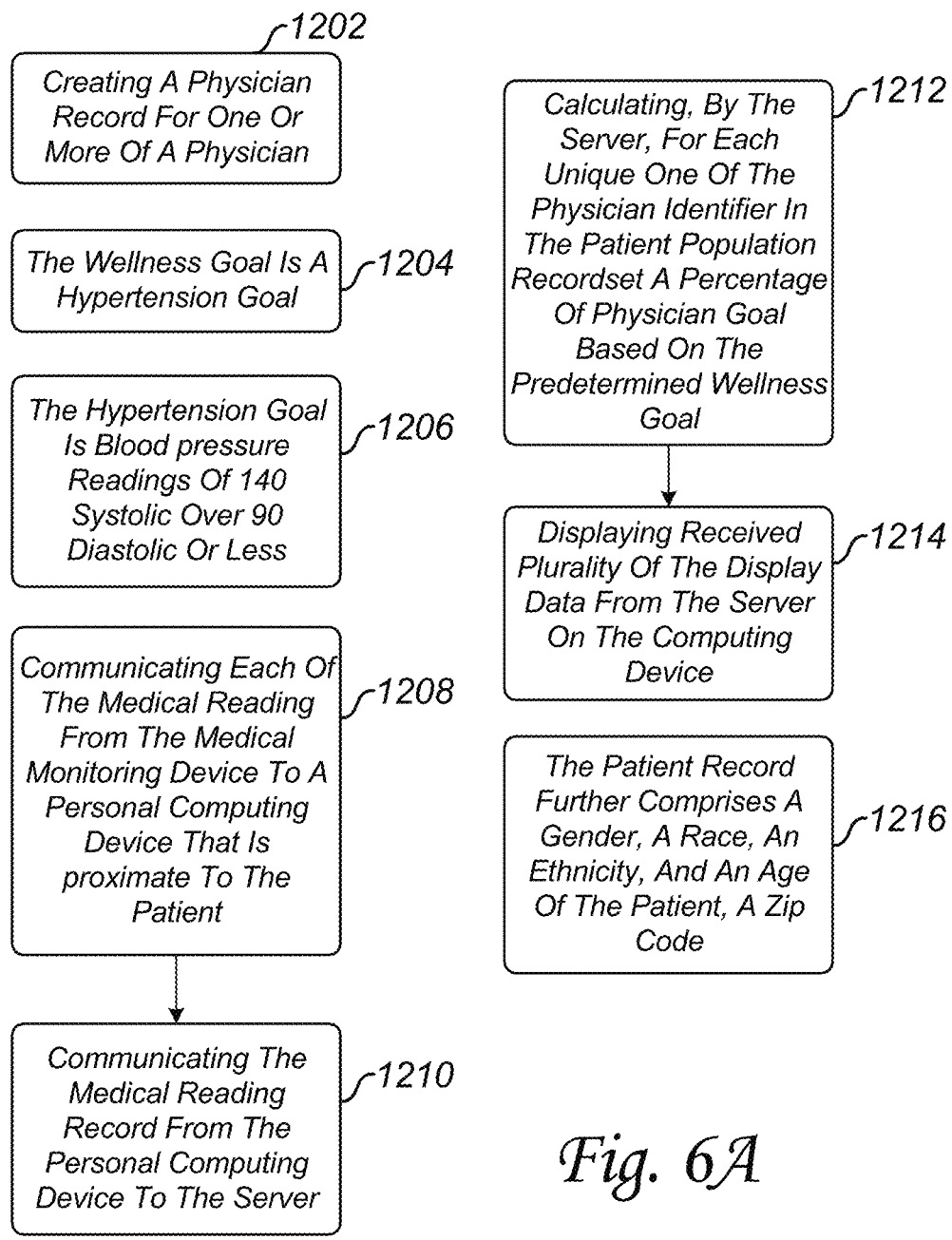
FIG. 6A-6B illustrates exemplary embodiments that can be used interchangeably with the methods of the present invention.
Figure 6B:
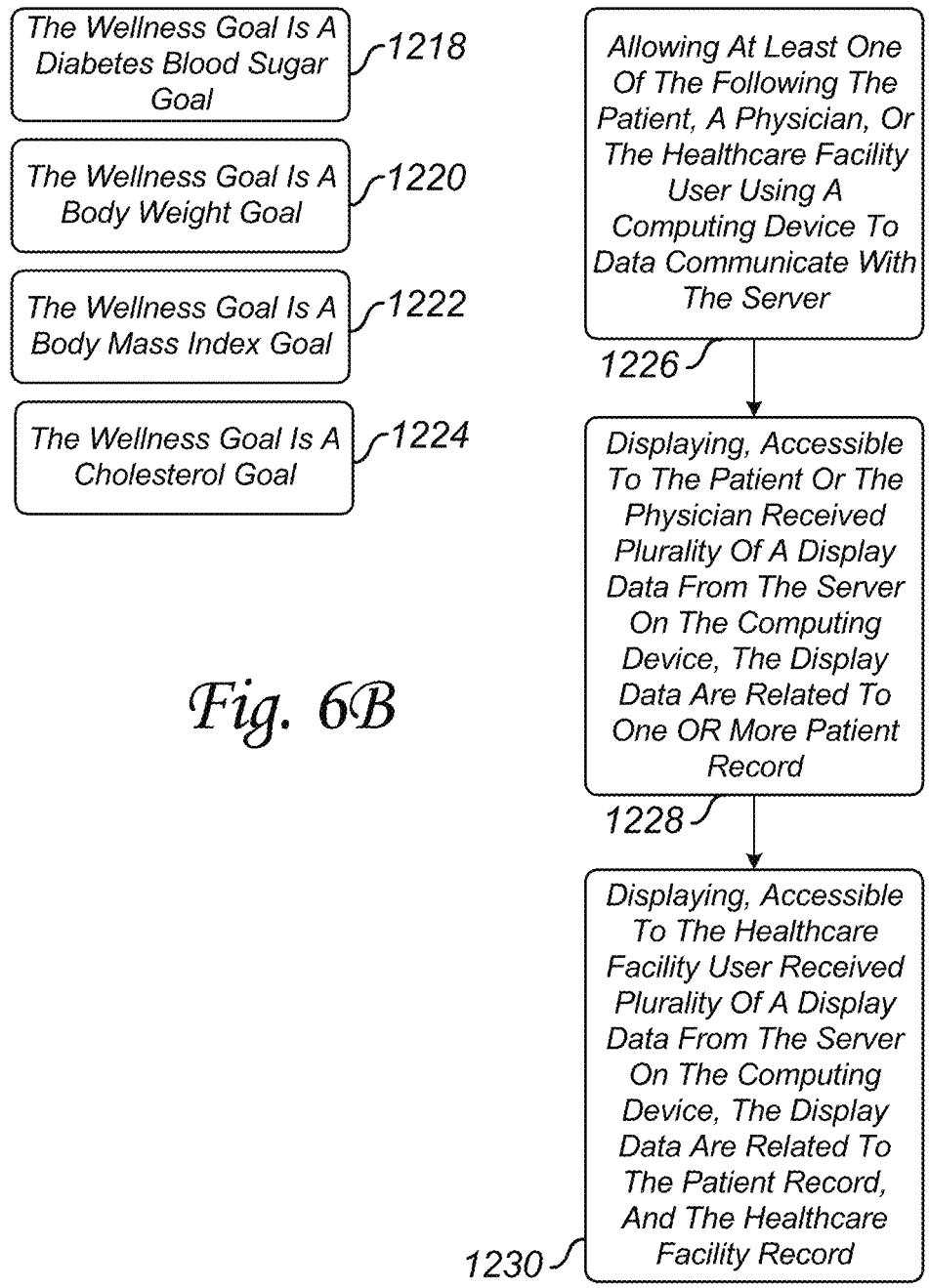

Referring to FIGS. 6A-6B, there are illustrated exemplary embodiments that can be used interchangeably with the methods of the present invention.

With reference to FIG. 6A, in step 1202, a physician record 610 for one or more physician 802 can be created. The physician record 610 can comprise a physician identifier. The patient record 608 can comprise the physician identifier associated with the physician 802 that is assigned to patient 102. The healthcare facility record 606 can comprise the physician identifier associated with the physician 802 that is assigned to the healthcare facility 402.

In step 1204, the wellness goal can be a hypertension goal. The medical monitoring device 302A can be a blood pressure monitoring device. The medical reading 220 can be a blood pressure reading.

In step 1206, the hypertension goal is a blood pressure reading of 140 systolic over 90 diastolic or less.

In step 1208, each medical reading 220 is data communicated from the medical monitoring device 302A-E to a personal computing device 212B that is proximate to the patient 102. The method then moves to step 1210.

In step 1210, the medical reading 220 is data communicated from the personal computing device 212B to server 202.

In step 1212, by server 202, for each unique physician identifier discoverable from the patient population recordset a 'percentage of physician goal' based on the predetermined wellness goal can be calculated. The medical reading record 612 comprises the physician identifier associated with the patient identifier. The method then moves to step 1214.

In step 1214, the received plurality display data from server 202 are displayed on computing device 212. The display data are accessible to the healthcare evaluator or other authorized users 502. The display data are related to one or more of the physician record 614 and the percentage of physician goal based on the predetermined wellness goal that the patient record 102 is associated with.

In step 1216, the patient record 608 further comprises fields for a patient's gender, race, ethnicity, age, zip code, and other information. The patient population segmentation rule 626 queries to create the patient population recordset 614 based on at least one of the following patient segmentation criteria gender, race, ethnicity, age, healthcare facility, a physician that is assigned to at least one of the patients, or date and timestamp range associated with a date and a timestamp of the medical readings.

With reference to FIG. 6B, in step 1218, the wellness goal is a diabetes blood sugar goal. The medical monitoring device is a glucose monitoring device 302B. The medical reading is a blood glucose reading.

In step 1220, the wellness goal is a body weight goal. The medical monitoring device is a scale device 302C. The medical reading is a body weight reading.

In step 1222, the wellness goal is a body mass index goal. The medical monitoring device is a scale device 302C suitable for measuring body mass index. The medical reading is a body mass index reading.

In step 1224, the wellness goal is a cholesterol goal. The medical monitoring device is a device suitable for measuring cholesterol 302D. The medical reading is a cholesterol reading.

In step 1226, at least one of the following the patient 102, a physician 802, or the healthcare facility 402 users using the computing device is allowed to data communicate with the server. The method then moves to step 1228.

In step 1228, accessible to patient 102 or physician 802, the received plurality of display data from server 202 is displayed on computing device 212. The display data are related to one or more of the patient record 608 and the percentage of patient goal based on the predetermined wellness goal that the patient record 608 is associated with. The method then moves to step 1230.

In step 1230, accessible to the healthcare facility 402 users, received plurality of a display data from the server 202 is displayed on the computing device 212. The display data are related to one or more of the patient record 608 and the percentage of patient goal based on the predetermined wellness goal that the patient record 608 is associated with, and one or more of the healthcare facility record 606 and the percentage of healthcare facility goal based on the predetermined wellness goal that the healthcare facility record 606 is associated with.

Referring to FIGS. 7-10, there are illustrated examples of user interface screens for evaluating the progress of a managed care organization's patient wellness goals.

Figure 7:
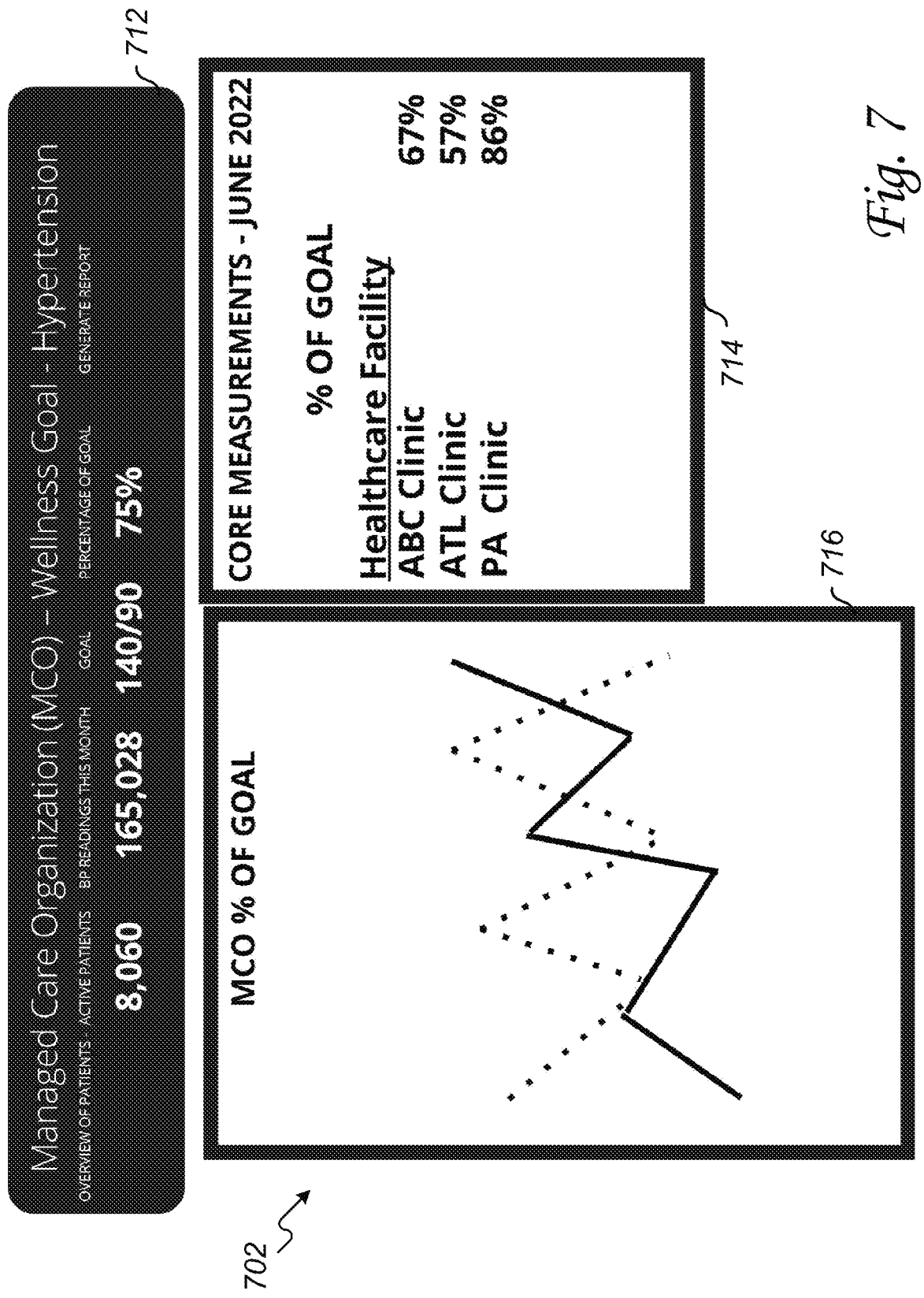

In an exemplary embodiment, with reference to FIG. 7, there is illustrated a managed care organization 618 user interface screen 702 displaying received plurality of a display data from the server 202 on the computing device 212. The display data are accessible to the healthcare evaluator or other authorized users 502, and other authorized users. The display data are related to the percentage of managed care organization goal based on the predetermined wellness goal.

In an exemplary embodiment, in 712 display data related to the number of patients, for hypertension wellness goals the number of blood pressure readings, the target medical reading goal, in this case 140 systolic over 90 diastolic, and the percent of managed care organization goal from all the blood pressure medical readings, the percentage of blood pressure medical readings that met the target medical reading goal of 140 systolic over 90 diastolic, and other information.

In 714, display data can include information about the healthcare facilities 402 that are assigned to the managed care organization 618 as well as the percentage of healthcare facility goal for each healthcare facility 402 based on the predetermined wellness goal. In this example, the percentage of healthcare facility goal that meet the predetermined wellness goal such as hypertension in this case.

In 716, display data can include graphs that visually illustrate the data, as may be required and/or desired in a particular embodiment.

Figure 8:
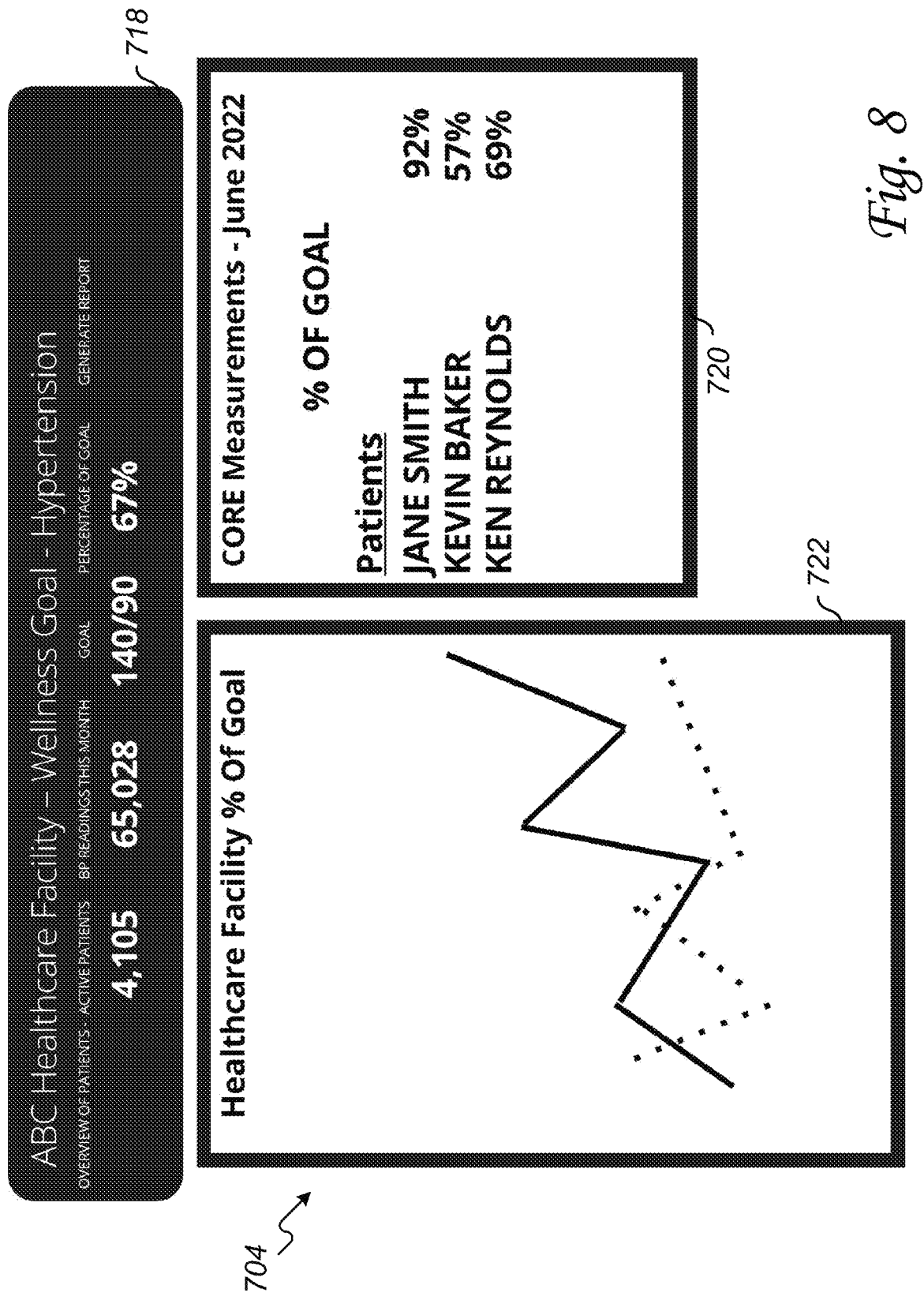

In an exemplary embodiment, with reference to FIG. 8, there is illustrated a healthcare facility 402 user interface screen 704 displaying received plurality of a display data from the server 202 on the computing device 212. The display data are accessible to the healthcare evaluator 502 or other authorized users 502. The display data are related to the percentage of healthcare facility goal based on the predetermined wellness goal.

In an exemplary embodiment, in 718 display data related to the number of patients, for hypertension wellness goals the number of blood pressure readings, the target medical reading goal, in this case 140 systolic over 90 diastolic, and the percent of healthcare facility goal as from all the blood pressure medical readings, the percentage of blood pressure medical readings that met the target medical reading goal of 140 systolic over 90 diastolic.

In 720, display data can include information about the patients 102 that are assigned to the healthcare facility 402 as well as the percentage of patient goal for each patient 102 based on the predetermined wellness goal. In this example, the percentage of patient goal that meets the predetermined wellness goal such as hypertension in this case.

In 722, display data can include graphs that visually illustrate the data, as may be required and/or desired in a particular embodiment.

Figure 9:
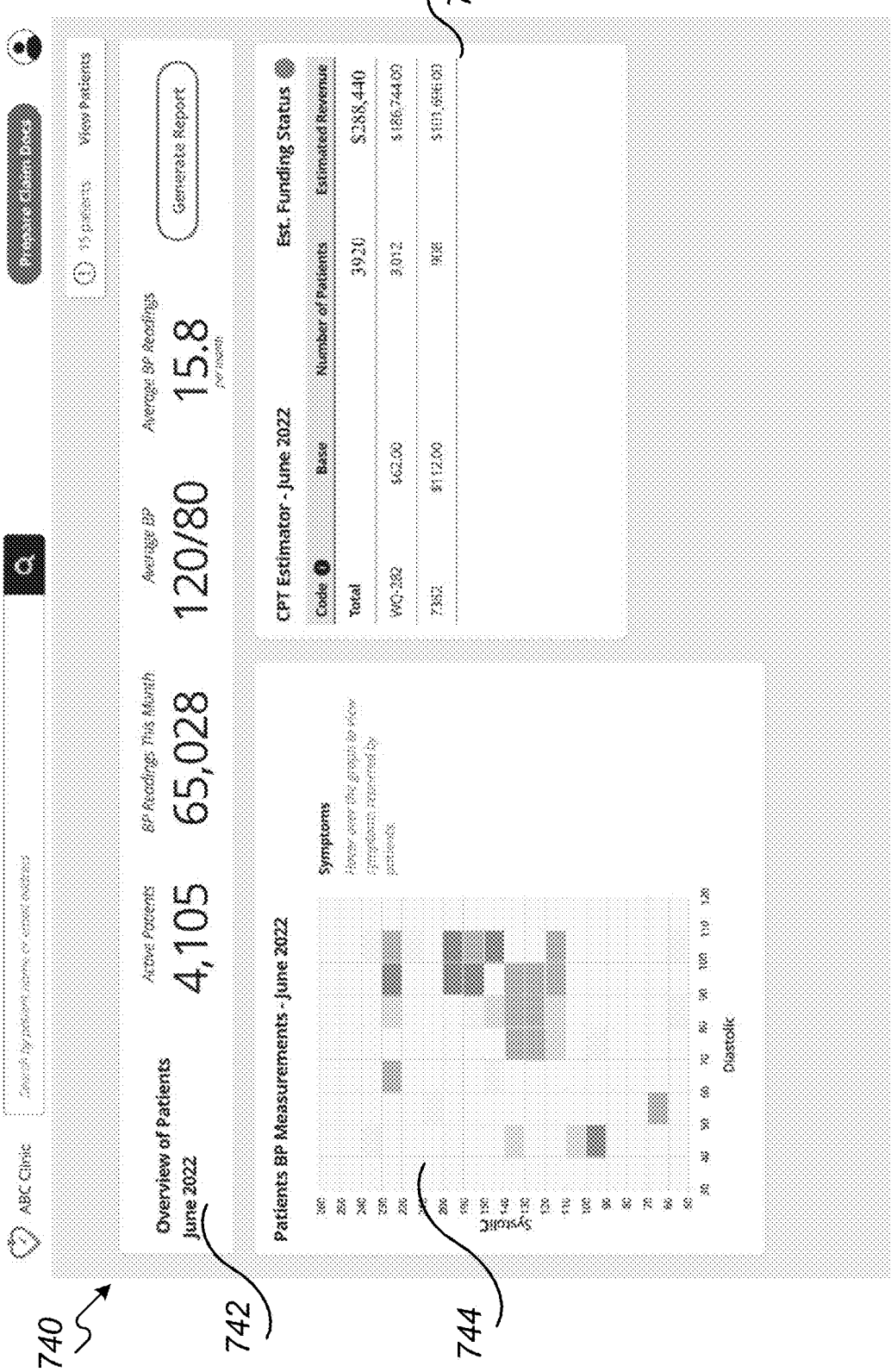

In an exemplary embodiment, with reference to FIG. 9, there is illustrated a healthcare facility 402 user interface screen 740 displaying received plurality of a display data from the server 202 on the computing device 212. The display data are accessible to the healthcare evaluator 502 or other authorized users 502. The display data are related to Current Procedural Terminology (CPT) Estimator Codes. The user interface screen 740 broadly relates to the number of patients in the patient population recordset 614 that meet a minimum progress standard for a particular symptom indicated by a CPT Code. The healthcare facility 402 can be paid or otherwise receive funding based on the number of patients that meet the minimum progress standard for a CPT Code and thus dashboard 740 can be used as a healthcare facility 402 revenue estimator for CPT Codes listed. A minimum progress standard can be an agreed blood pressure reading such as a blood pressure reading of less than 120 systolic over 80 diastolic.

In 742, display data can include summary information about the number of patients and number of blood pressure readings in the patient population recordset 614, and other information.

In 744, display data can include graphs that visually illustrate the data, as may be required and/or desired in a particular embodiment.

In 746, display data can include a revenue estimate for each listed CPT code based on the number of patients that meet the minimum progress standard.

Figure 10:
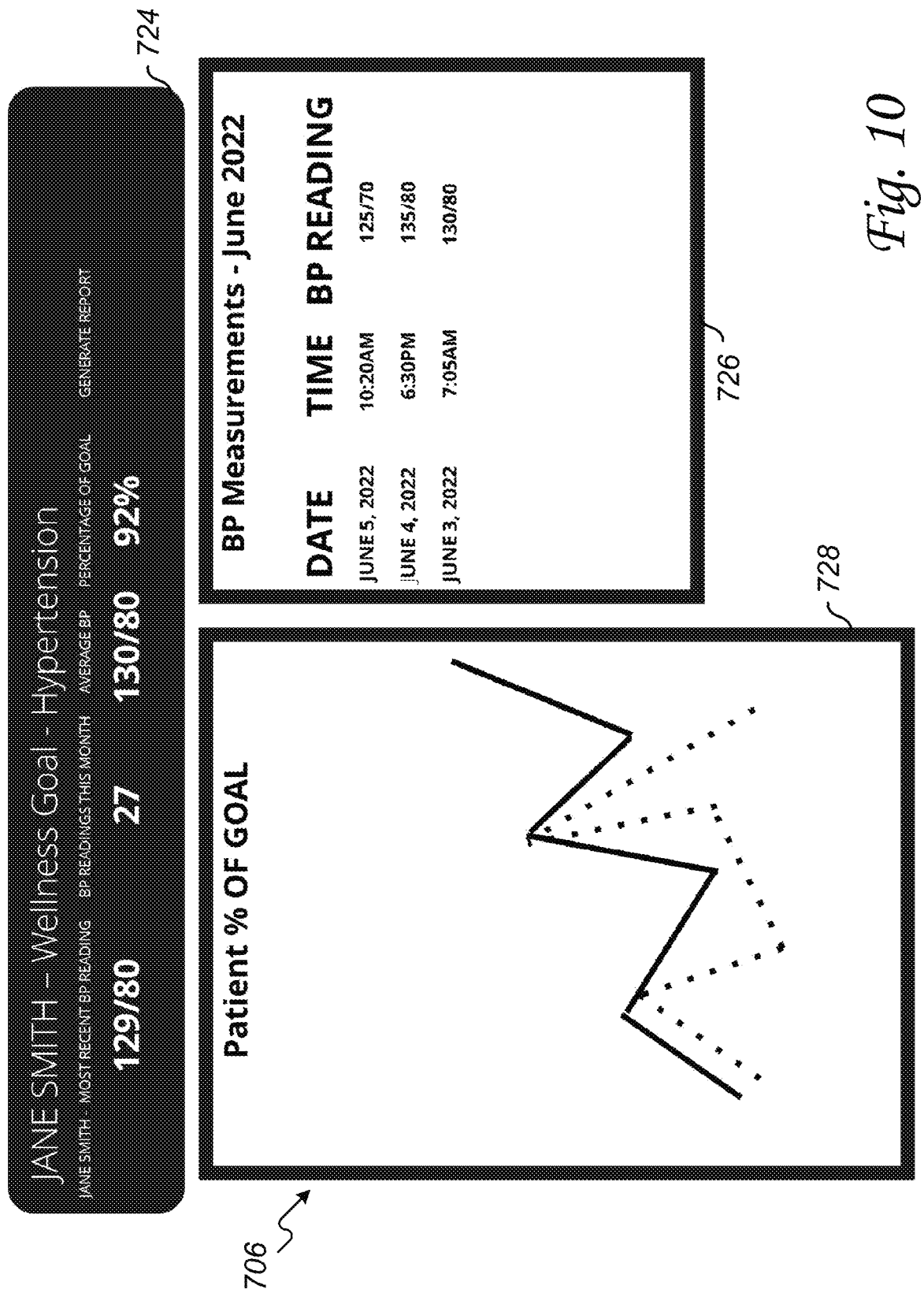

In an exemplary embodiment, with reference to FIG. 10, there is illustrated a patient 102 user interface screen 706 displaying received plurality of a display data from the server 202 on the computing device 212. The display data are accessible to the healthcare evaluator or other authorized users 502, and other authorized users 102/402/502/802. The display data are related to the percentage of patient goal based on the predetermined wellness goal.

In an exemplary embodiment, in 724 display data related to the patient and the patient's hypertension wellness goals including the number of blood pressure readings, the average medical reading, and the percent of patient goal as from all the blood pressure medical readings, the percentage of blood pressure medical readings that met the target medical reading goal, as an example and not a limitation, 140 systolic over 90 diastolic.

In 726, display data can include information about the patient's 102 individual blood pressure medical readings including the date, timestamp, and the medical reading.

In 728, display data can include graphs that visually illustrate the data, as may be required and/or desired in a particular embodiment.

Figure 11:
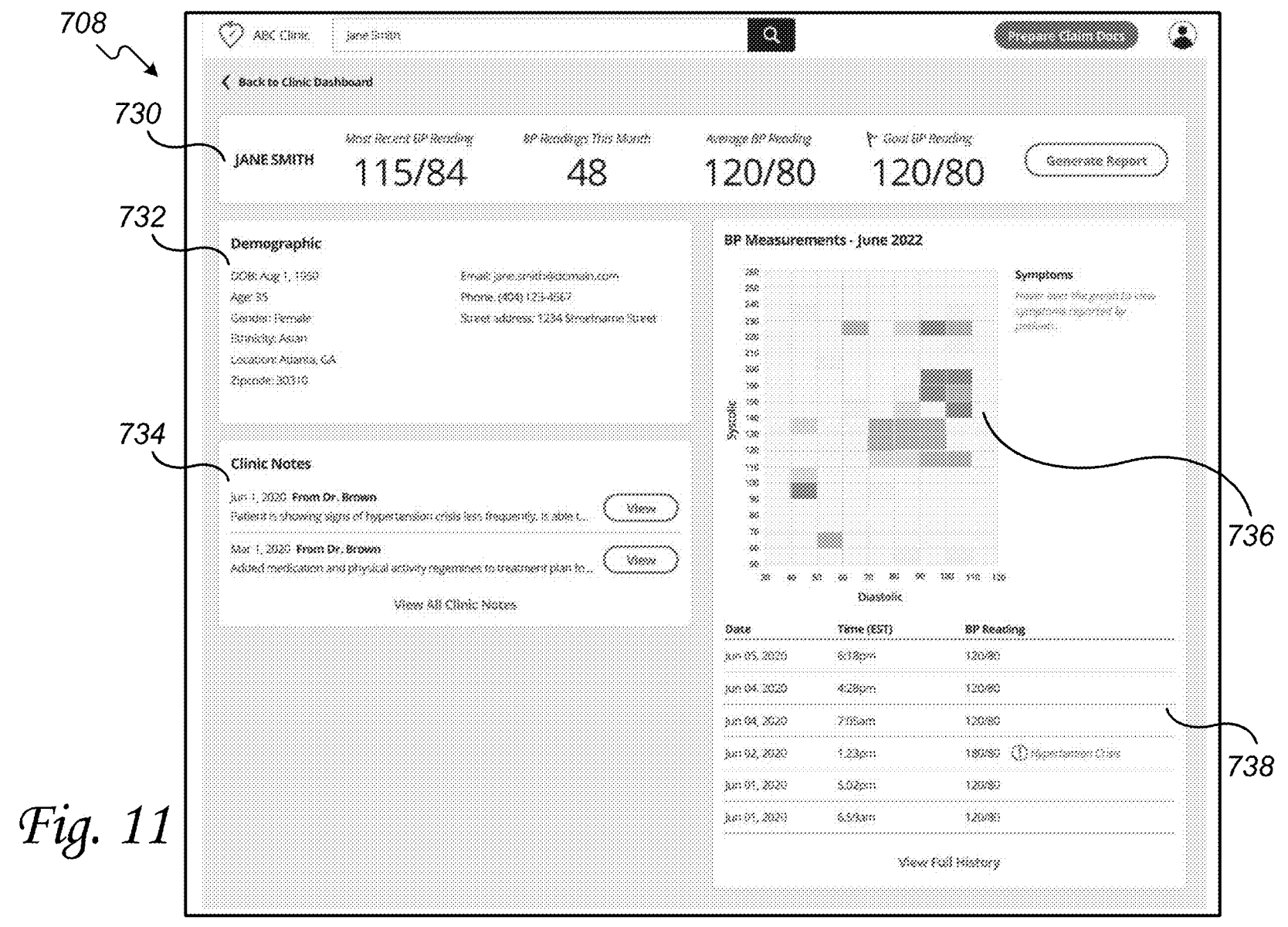

In an exemplary embodiment, with reference to FIG. 11, there is illustrated a patient 102 user interface screen 708 displaying received plurality of a display data from the server 202 on the computing device 212. The display data are accessible to the healthcare evaluator or other authorized users 502, and other authorized users 102/402/502/802. The display data are related to the percentage of patient goal based on the predetermined wellness goal.

In an exemplary embodiment, in 730 display data related to the patient and the patient's hypertension wellness goals including the number of blood pressure readings, the most recent blood pressure reading, the number of blood pressure readings in a report time period, the average medical reading, and the predetermined wellness goal also referred to as the target medical reading or goal blood pressure reading.

In 730, display data can include demographic information about patient 102.

In 734, display data can include notes about patient 102.

In 736, display data can include graphs that visually illustrate the data, as may be required and/or desired in a particular embodiment.

In 738, display data can include information about the patient's 102 individual blood pressure medical readings including the date, timestamp, and the medical reading.

Figure 12:
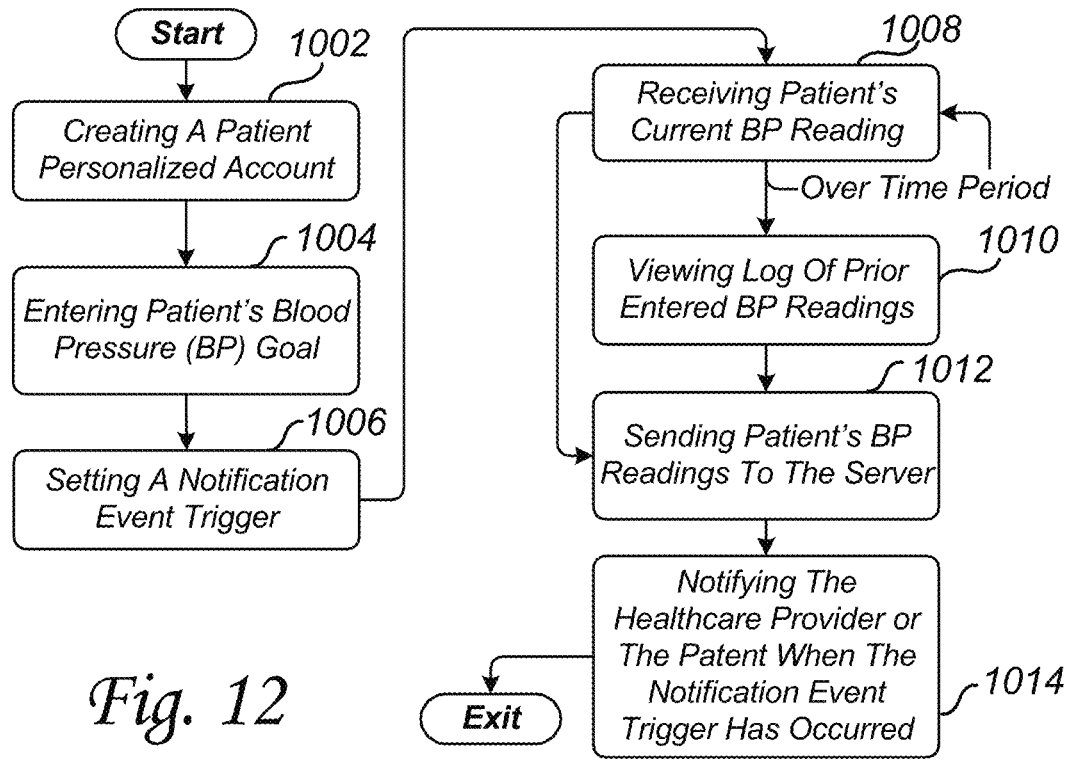
FIG. 12 illustrates one example of a method of monitoring blood pressure.

Referring to FIG. 12, there is illustrated a method of monitoring blood pressure. As one of the wellness goals, hypertension requires that the patient's blood pressure be monitored with frequent medical readings 220 taken over a time period. A personal computing device 212B software application can assist a patient in recording blood pressure readings. In an exemplary embodiment, a patient 102 can log blood pressure medical readings 220, generate graphs of historic blood pressure readings, receive notification alerts, transmit their readings to a healthcare provider, access information related to healthy living, hypertension, evaluate the percentage of patient goals base on a predetermined wellness goal, and other types and kinds of information.

The method begins in step 1002 where a patient 102 is allowed to register on server 202 using a computing device 212A-B to establish a personalized account to track, monitor, and save their blood pressure readings in a database 206A. Once registered, in step 1004 the patient 102 or the patient's physician 802 can set a target blood pressure goal also referred to as a predetermined blood pressure goal. A target blood pressure goal is a target by which a patient 102 can compare their blood pressure readings and a percentage of patient goal can be determined to and track progress in reaching the target blood pressure goal through healthy living, changes in diet and activity, use of medications, and other measures.

In step 1006, patient 102, physician 802, or a healthcare provider 402 can set notification event triggers. Such notification events can be alerts that advise patient 102 to contact their doctor and/or appropriate care if medical reading 220 is 180 systolic over 120 diastolic or higher (also known as hypertension crisis), reminders to patients 102 to perform their daily, weekly, or monthly blood pressure readings, and other types and kinds of notification events, as may be required and/or desired in a particular embodiment.

In step 1008, patient 102 can repeatedly enter blood pressure readings over time. The blood pressure reading can be stored in a medical reading record 612 table in a database such as a database 206A associated with the patient's 102 personalized account. Selectively, patient 102 in step 1010 can view historic blood pressure readings in graph and log or list formats on their computing device 212A-B.

In step 1012 the current blood pressure reading can be data communicated or otherwise transmitted to server 202.

Finally, in step 1014 a determination can be made if a notification event trigger has occurred. If so, an alert can be sent to the healthcare provider 402, physician 802, or patient 102 as appropriate. The method is then exited.

Figure 13:
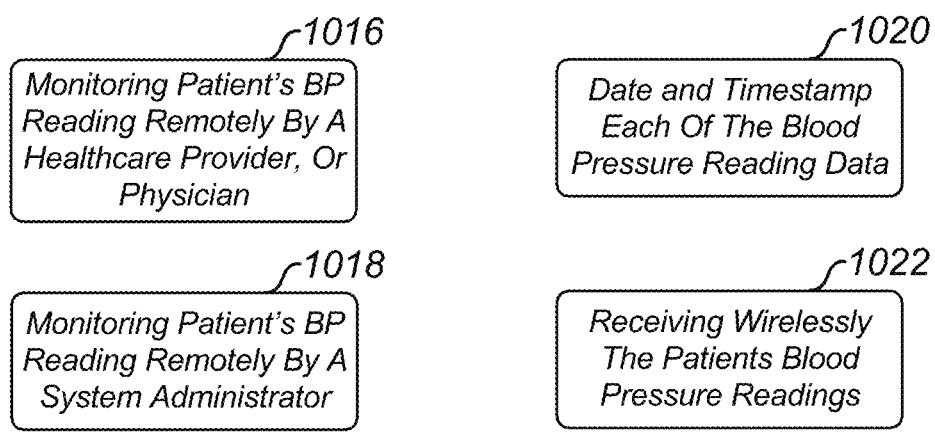
FIG. 13 illustrates exemplary embodiments that can be used interchangeably with the methods of the present invention.

Referring to FIG. 13, there are illustrated exemplary embodiments of the present invention that can be used interchangeably with the methods of the present invention.

In step 1016 a patient's blood pressure medical reading can be monitored remotely by a healthcare provider 402, physician 802 as required.

In step 1018 a patient's blood pressure reading can be monitored remotely by a healthcare evaluator or administrator 502 as required.

The present invention supports self-reported applications. In this regard, in step 1020 each of the blood pressure readings, and medical reading data can be date and time-stamp.

In step 1022, the patient's blood pressure readings are received by the computing device wirelessly. Then once received the application is populated with the patient's blood pressure reading data.

Referring to FIGS. 12-19, there are illustrated examples of user interface screenshots of a blood pressure monitoring application. In an exemplary embodiment, an application can run on an iPhone, Android, or other smartphone or tablet computing device 212B.

Figure 14:
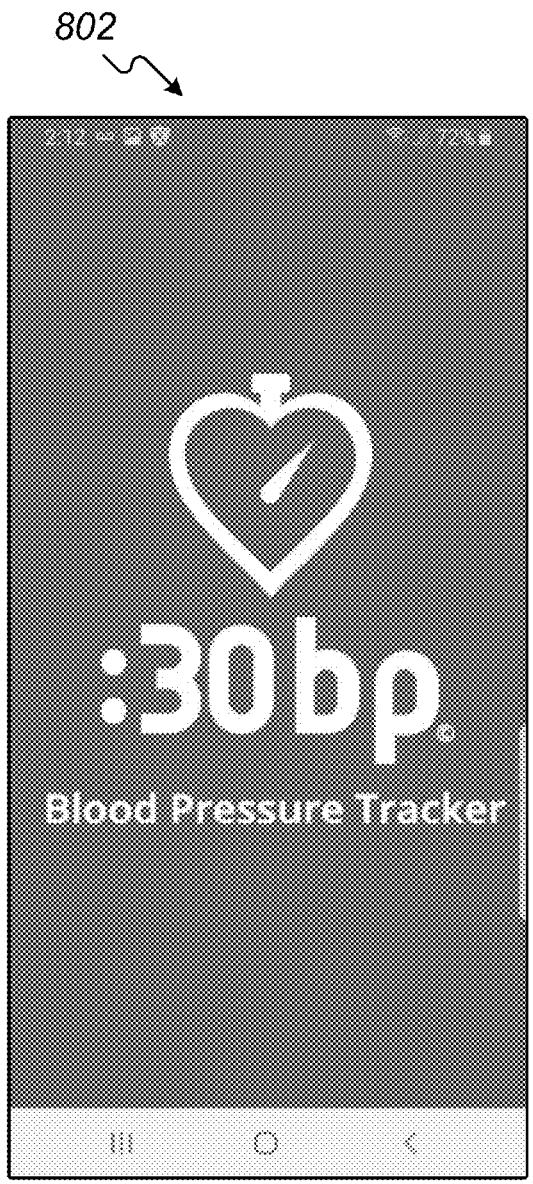
FIGS. 14-22 illustrate examples of a patient user interface of a blood pressure monitoring application.

In an exemplary embodiment, FIG. 14 illustrates one example of when a welcome screenshot 802 that patient 102 is greeted with when launching the application.

Figure 15:
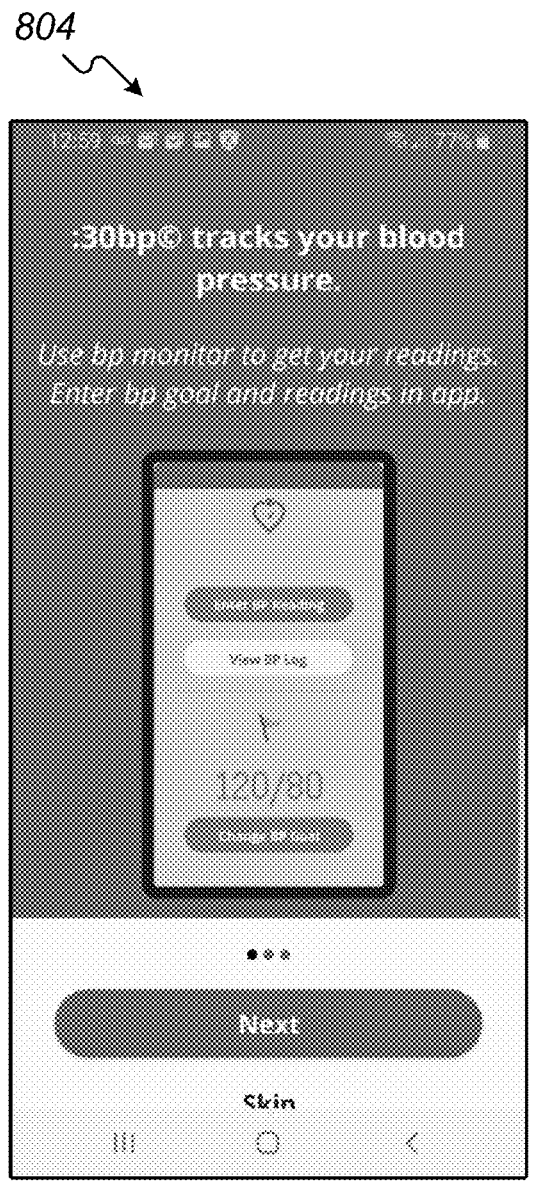

In an exemplary embodiment, FIG. 15 illustrates one example of a first information screenshot 804 introducing the application to the patient as one that tracks the patient's blood pressure.

Figures 16, 17:
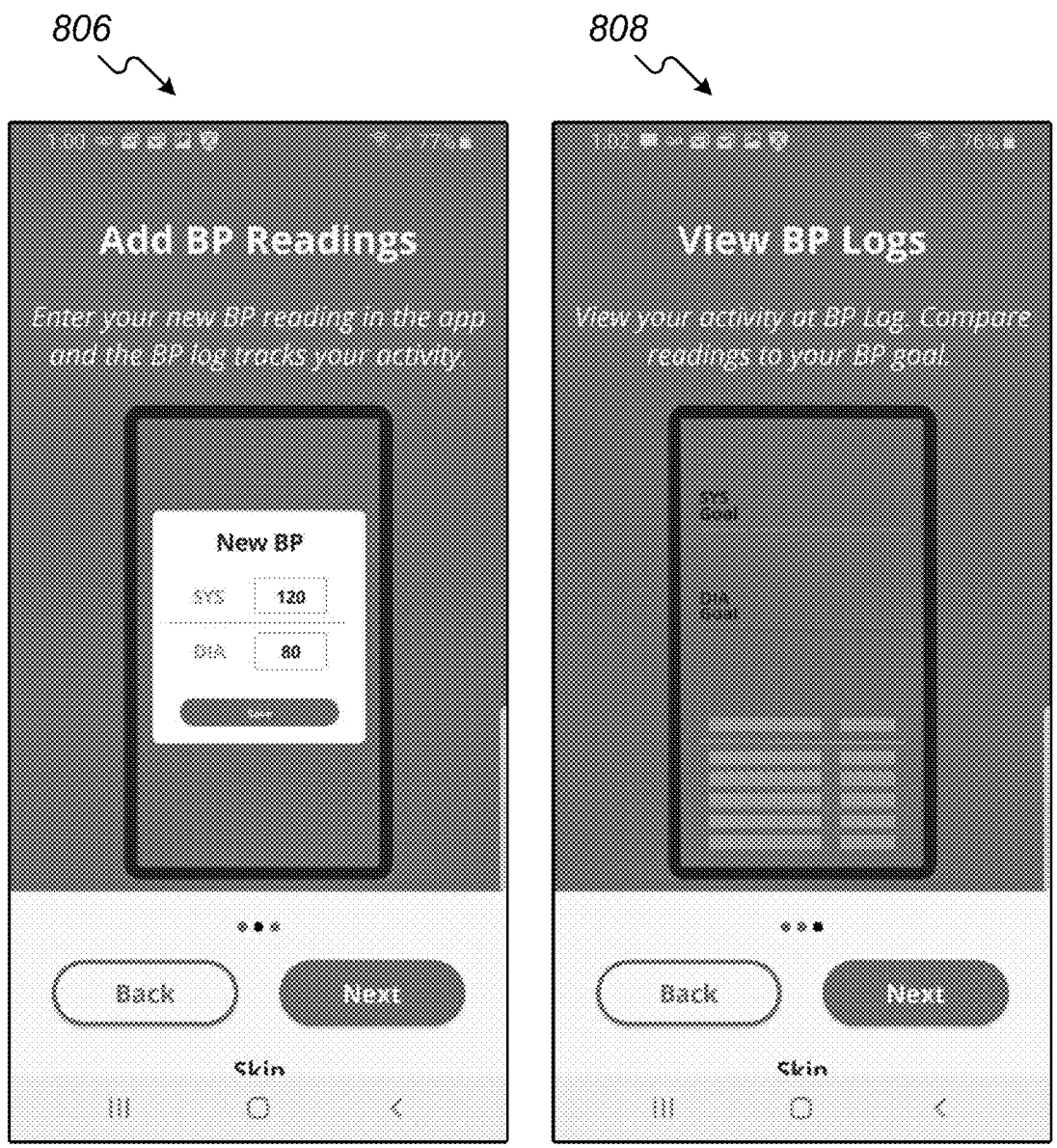

In an exemplary embodiment, FIG. 16 illustrates one example of a second information screenshot 806 informing patient 102 that they can add blood pressure readings to the application. Such blood pressure readings can be stored on server 202, on the computing devices 212A-B, or alternatively on other devices or databases, as may be required and/or desired in a particular embodiment.

In an exemplary embodiment, FIG. 17 illustrates one example of a third information screenshot 808 informing patient 102 that they can view their historical blood pressure readings in log view or graph form.

Figure 18:
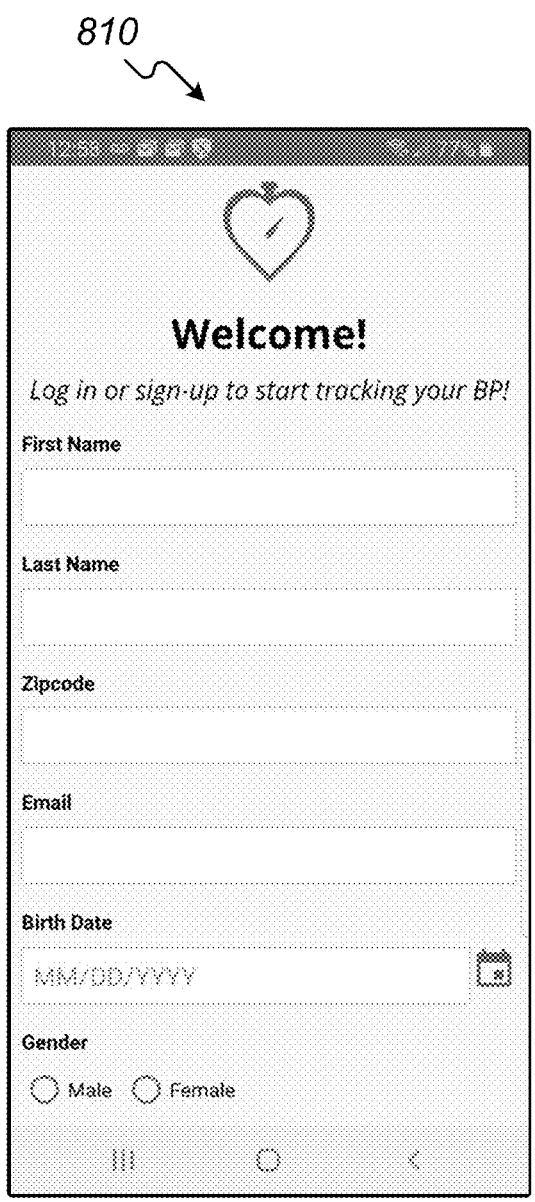

In an exemplary embodiment, FIG. 18 illustrates one example of a patient 102 registration screenshot 810 where a new patient can register and create a personalized account in which to record and view blood pressure readings among other things, and access other features.

Figure 19:
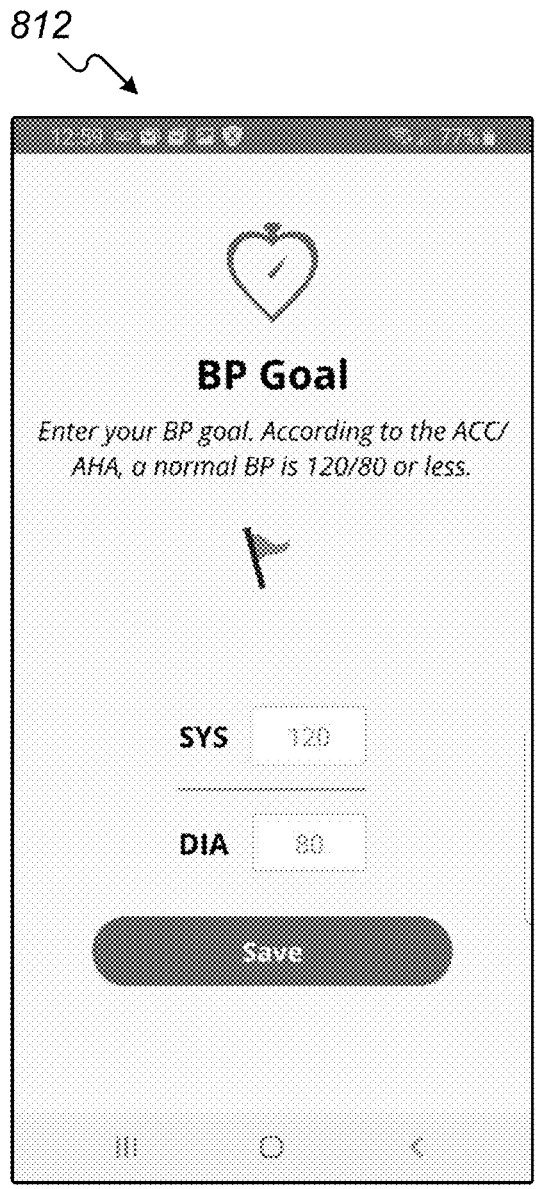

In an exemplary embodiment, FIG. 19 illustrates one example of a blood pressure goal-setting screenshot 812 where a patient 102 or physician 802 can enter or otherwise set a target blood pressure goal also referred to as a predetermined wellness goal.

Figure 20:
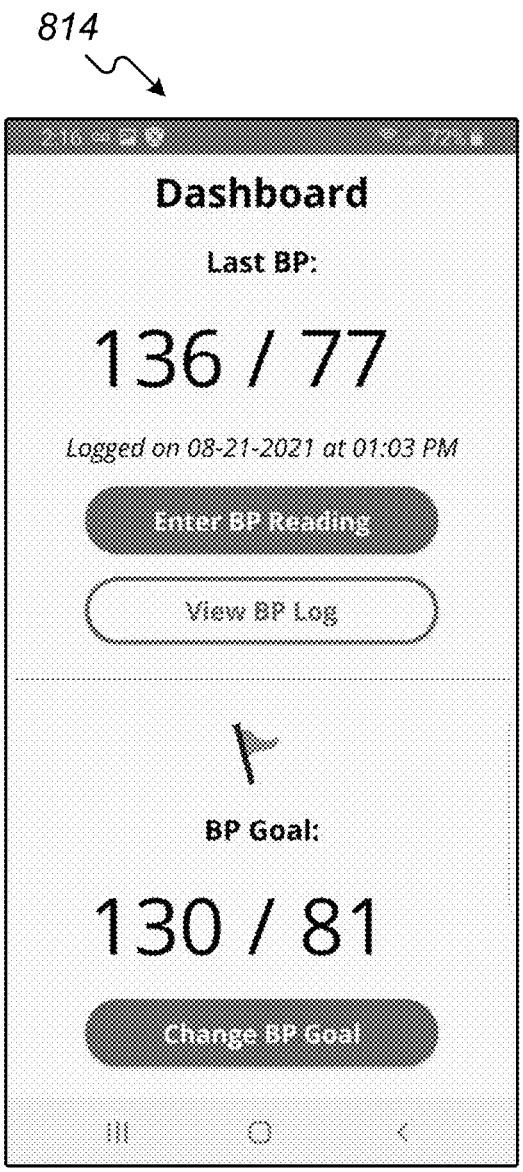

In an exemplary embodiment, FIG. 20 illustrates one example of a dashboard screenshot 814. From the dashboard, patient 102 can enter and record a blood pressure read, view their blood pressure log, set notification events, or change their blood pressure goal.

Figure 21:
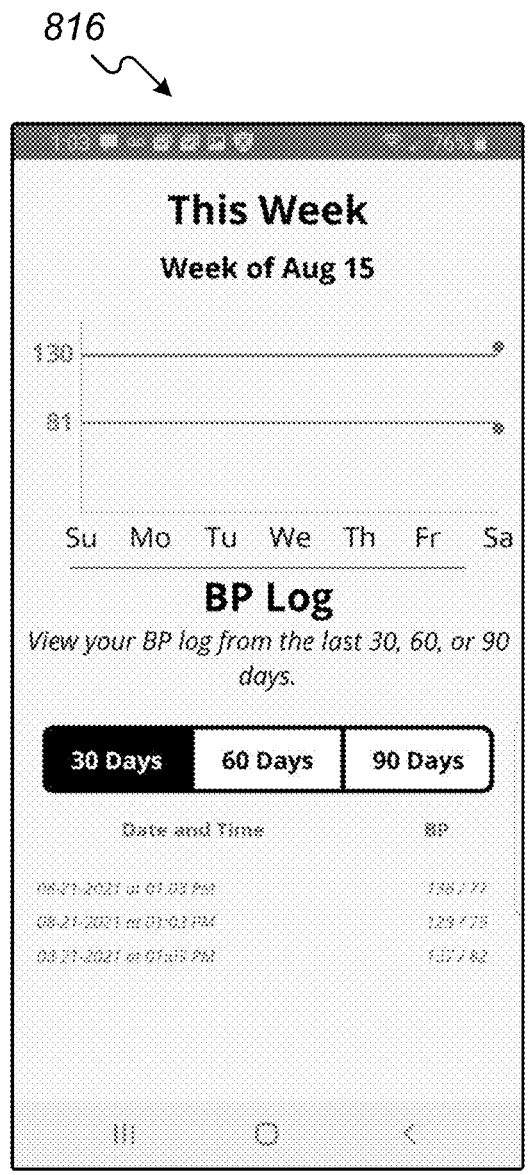

In an exemplary embodiment, FIG. 21 illustrates one example of a blood pressure log screenshot 816 where a patient 102 can view details including graphs and list files of their prior blood pressure readings.

Figure 22:
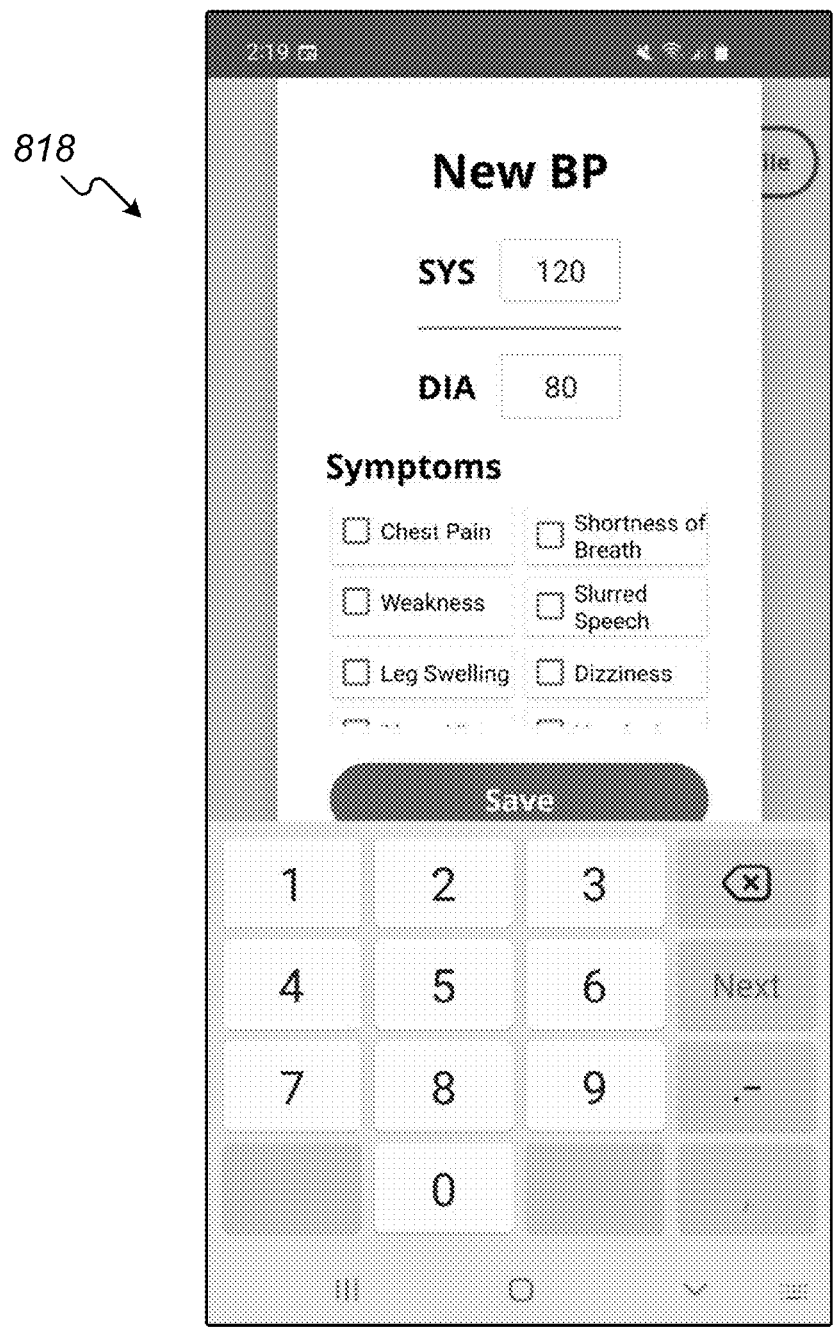

In an exemplary embodiment, FIG. 22, illustrates one example of a blood pressure log screenshot 818 where a patient 102 can self-report blood pressure medical readings as well as patient 102 symptoms.

The capabilities of the present invention can be implemented in software, firmware, hardware, or some combination thereof.

As one example, one or more aspects of the present invention can be included in an article of manufacture (e.g., one or more computer program products) having, for instance, the computer usable media. The media has embodied therein, for instance, computer-readable program code means for providing and facilitating the capabilities of the present invention. The article of manufacture can be included as a part of a computer system or sold separately.

Additionally, at least one program storage device readable by the machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements.

What is claimed is:

1. A computer-implemented method executed by a server and a healthcare data management system for managed care organization (MCO) and healthcare facility wellness goal tracking and compliance analysis across distributed patient populations, by transforming timestamped medical readings from disparate patient-operated devices into structured, disease-specific compliance metrics associated with a multi-level data hierarchy comprising individual patients, their assigned healthcare facilities, and overseeing managed care organizations, while restricting access to medical data in accordance with user role and applicable healthcare requirements, regulations, and laws, the method comprising:
  receiving, by the server, a plurality of medical readings generated by at least one FDA-certified patient-operated medical monitoring device, the device being selected from a group consisting of a blood pressure monitor, a body weight scale, a blood oxygen monitor, a glucose meter, an electrocardiogram device, and an electroencephalogram device;
  wherein each of the medical readings is received via one or more of:
    a direct wireless transmission from the device to the server;
    a local transmission to a patient-side computing device with subsequent relay to the server; and
    a wired connection from the device to a computing device for data relay;
  wherein each medical reading includes at least one of blood pressure, body weight, or blood oxygen level data, and each medical reading is associated with a corresponding reading timestamp;
  associating, by the server, each of the received medical readings with a structured database hierarchy comprising:
    a patient record corresponding to a patient associated with the medical reading;
    a healthcare facility record corresponding to a healthcare facility associated with the patient; and
    a managed care organization record corresponding to a managed care organization associated with the healthcare facility;
  wherein the associating step includes applying one or more device-to-patient assignment mappings and generating linkage records across each level of the database hierarchy such that:
    each medical reading is assigned to the corresponding patient record;
    the patient record is linked to the corresponding healthcare facility record; and
    the healthcare facility record is linked to the corresponding managed care organization record;
  wherein the patient record, the healthcare facility record, and the managed care organization record are stored in a database residing on at least one of: the server, a computing device, or both;
  generating, by a segmentation module executed by the server, a patient population recordset by applying one or more segmentation rules based on one or more of:
    patient demographic attributes;
    physician assignment data;
    healthcare facility membership;
    disease state classification; and
    reading timestamp intervals associated with the medical readings;
  defining, by the server, at least one wellness goal, the wellness goal being associated with a particular disease state and including at least one target threshold for one or more of the medical readings received from the at least one device;
  calculating, by the server, a percentage-of-goal compliance score for the patient population recordset by:
    evaluating the medical readings in the patient population recordset against the at least one target threshold of the wellness goal; and
    determining a percentage of the medical readings that meet or exceed the at least one target threshold;
  associating, by the server, the percentage-of-goal compliance score calculated with a wellness goal tracking record for each of:
    the patient associated with each medical reading in the patient population recordset;
    a physician assigned to the patient;
    the healthcare facility associated with the patient; and
    the managed care organization associated with the healthcare facility;
  such that the percentage-of-goal compliance score is simultaneously linked to multiple hierarchical levels for persistent storage and analysis;
  restricting, by a user access control module executed by the server, visibility of the medical readings and the percentage-of-goal compliance score calculated based on a user role and a corresponding access level within the multi-level data hierarchy, such that:
    a physician user is authorized to access data associated with patients assigned to that physician;
    a facility administrator user is authorized to access data associated with patients and physicians within the corresponding healthcare facility; and a managed care organization user is authorized to access the percentage-of-goal compliance scores aggregated and associated with multiple facilities and patient populations;

displaying, by a user interface executing on an authorized client device, structured display data corresponding to the percentage-of-goal compliance score calculated, the display data being formatted and filtered based on the user role and the access level.

2. The method in accordance with claim 1, wherein the wellness goal is a hypertension goal, the medical monitoring device is a blood pressure monitoring device, the medical reading is a blood pressure reading associated with a timestamp and patient identifier and stored in the hierarchical medical reading record.

3. The method in accordance with claim 2, wherein the hypertension goal is defined as blood pressure readings of less than 140 systolic over 90 diastolic, and the percentage of goal is automatically calculated by the server based on comparison of the readings to the defined hypertension threshold.

4. The method in accordance with claim 1, further comprising the steps of:

communicating each of the medical reading from the medical monitoring device to a personal computing device that is proximate to the patient; and communicating the timestamped and patient-identified medical reading from the personal computing device to the server for inclusion in the medical reading record.

5. The method in accordance with claim 1, further comprising the steps of:

creating a physician record for at least one physician, the physician record comprises a physician identifier, the patient record comprises the physician identifier associated with the physician that is assigned to the patient, the healthcare facility record comprises the physician identifier associated with the physician that is assigned to the healthcare facility; and dynamically adjusting a physician goal, via server-executed computation, based on comparative outcomes derived from medical readings across the patient population recordset and stratified by patient demographics and wellness progression.

6. The method in accordance with claim 5, further comprising the steps of:

calculating, by the server, for each unique physician identifier discoverable from the patient population recordset a percentage of physician goal based on dynamic adjustments to the predetermined wellness goal;

wherein dynamically adjusting the physician goal is further based on comparative patient outcomes derived from medical readings across the patient population recordset; and displaying, on the computing device, a received plurality of display data from the server, filtered by user authorization level, and comprising one or more of the physician record and the adjusted percentage of physician goal.

7. The method in accordance with claim 1, wherein the patient record further comprises a gender, a race, an ethnicity, an age, a zip code, the patient population segmentation rule queries to create the patient population recordset based on at least one of the following patient segmentation criteria: the gender, the race, the ethnicity, the age, the healthcare facility, a physician assigned to the patient, or timestamp associated with the medical reading.

8. The method in accordance with claim 1, wherein the wellness goal is at least one of the following:

a diabetes blood sugar goal, the medical monitoring device is a glucose monitoring device, the medical reading is a blood glucose reading;

a body weight goal, the medical monitoring device is a scale device, the medical reading is a body weight reading;

a body mass index goal, the medical monitoring device is a scale device suitable for measuring body mass index, the medical reading is a body mass index reading; or a cholesterol goal, the medical monitoring device is a device suitable for measuring cholesterol, the medical reading is a cholesterol reading;

wherein the server evaluates each reading against its associated goal and aggregates the percentage of goal accordingly.

9. The method in accordance with claim 1, further comprising the steps of:

allowing at least one of the following: the managed care organization, a physician, or the healthcare facility user using the computing device to data communicate with the server;

displaying, accessible to the managed care organization, the physician or the healthcare facility, received plurality of a display data from the server on the computing device, the display data are related to one or more of the patient record and the percentage of patient goal based on the predetermined wellness goal that the patient record is associated with; and displaying, accessible to the healthcare facility user, received plurality of a display data from the server on the computing device, the display data are related to one or more of the patient record and the percentage of patient goal based on the predetermined wellness goal that the patient record is associated with, and one or more of the healthcare facility record and the percentage of healthcare facility goal based on the predetermined wellness goal that the healthcare facility record is associated with;

wherein access control rules enforced by the server govern the display data based on the user's role and organizational affiliation.

10. A healthcare data management system configured for managed care organization (MCO) and healthcare facility wellness goal tracking and compliance analysis across distributed patient populations, by transforming timestamped medical readings from disparate patient-operated devices into structured, disease-specific compliance metrics associated with a multi-level data hierarchy comprising individual patients, their assigned healthcare facilities, and overseeing MCOs, while restricting access to medical data in accordance with user role and applicable healthcare requirements, regulations, and laws, the system comprising:

a server comprising a microprocessor and a memory storing non-transitory computer-readable instructions that, when executed, cause the server to:

receive a plurality of medical readings generated by at least one FDA-certified patient-operated medical monitoring device selected from the group consisting of: a blood pressure monitor, a body weight scale, a blood oxygen monitor, a glucose meter, an electrocardiogram device, and an electroencephalogram device;

wherein the plurality of medical readings are received via one or more of:

direct wireless transmission from the device to the server;
local transmission to a patient computing device with subsequent relay to the server; and
wired connection from the device to a computing device for data relay;
wherein each medical reading includes a timestamp and patient identifier;
a database residing on the server, a computing device, or both, and structured to store:
a patient record for each individual patient;
a healthcare facility record identifying assigned facilities for each patient;
a managed care organization record associating one or more healthcare facilities;
linkage records defining hierarchical associations between patients, facilities, and MCOs; and
a medical reading record for each received reading comprising: the medical reading, timestamp, device type, patient identifier, associated facility and MCO identifiers;
wherein the instructions further cause the server to:
generate a patient population recordset by applying segmentation rules based on one or more of:
patient demographics;
physician assignments;
facility membership;
disease state; and
reading timestamp intervals;
define at least one wellness goal associated with a particular disease state and a corresponding target threshold for the plurality of medical readings;
calculate a percentage-of-goal compliance score for the patient population recordset by:
evaluating the plurality of medical readings that are timestamped against the wellness goal thresholds; and
determining a percentage of medical readings that meet or exceed the thresholds;
associate the percentage-of-goal compliance score with a wellness goal tracking record at each applicable level of:
the patient;
the physician;
the healthcare facility; and
the managed care organization;
restrict access to the plurality of medical readings and the percentage-of-goal compliance scores based on user role and organizational level, such that:
a physician user is authorized to view only their assigned patient records;
a facility administrator is authorized to view all patient and physician records within their facility; and
an MCO user is authorized to view aggregated metrics across assigned facilities and patient populations;
detect changes in compliance over time by comparing new medical readings to previously stored values for the same patients and populations;
a computing device configured to allow an authorized user to connect to the server and view a user interface comprising:
structured display data corresponding to the calculated percentage-of-goal compliance score, rendered in accordance with the user's access level and organizational hierarchy.

11. The system in accordance with claim 10, wherein the wellness goal is a hypertension goal, the medical monitoring device is a blood pressure monitoring device, the medical reading is a blood pressure reading that is timestamped, patient-identified, and recorded within the hierarchical medical reading record by the server.

12. The system in accordance with claim 11, wherein the hypertension goal is defined by the system as blood pressure readings of less than 140 systolic over 90 diastolic, and the server is configured to calculate the percentage of patient population medical readings that meet this goal.

13. The system in accordance with claim 10, wherein the memory is encoded with instructions that when executed by the microprocessor perform the steps of:
creating a physician record for one or more of a physician, the physician record comprises a physician identifier, the patient record comprises the physician identifier associated with the physician that is assigned to the patient, the healthcare facility record comprises the physician identifier associated with the physician that is assigned to the healthcare facility; and
dynamically adjusting the physician goal through server-side data analysis based on comparative outcomes derived from timestamped and segmented medical readings across the patient population recordset.

14. The system in accordance with claim 13, wherein the memory is encoded with instructions that when executed by the microprocessor performs the steps of:
calculating, by the server, for each unique of the physician identifier discoverable from the patient population recordset a percentage of physician goal based on dynamic adjustments to the predetermined wellness goal;
wherein the dynamically adjusting the physician goal is further based on comparative patient outcomes derived from medical readings across the patient population recordset; and
displaying the resulting physician goal data and comparative analysis on the computing device based on the user's authorization level, wherein the display data is generated by the server and includes the dynamically adjusted goal.

15. The system in accordance with claim 10, wherein the patient record further comprises a gender, a race, an ethnicity, an age, a zip code, and wherein the memory is encoded with instructions that, when executed, implement a structured query based on patient population segmentation criteria including at least one of the following: gender, race, ethnicity, age, healthcare facility identifier, a physician assigned to the patient, or a date and timestamp range associated with the medical reading.

16. The system in accordance with claim 10, wherein the wellness goal is at least one of the following:
a diabetes blood sugar goal, the medical monitoring device is a glucose monitoring device, the medical reading is a blood glucose reading;
a body weight goal, the medical monitoring device is a scale device, the medical reading is a body weight reading;
a body mass index goal, the medical monitoring device is a scale device suitable for measuring body mass index, the medical reading is a body mass index reading; or
a cholesterol goal, the medical monitoring device is a device suitable for measuring cholesterol, the medical reading is a cholesterol reading
wherein each medical reading is associated with metadata including timestamp and patient identifier, and evaluated by the server to determine percentage of goal attainment across a defined population segment.

17. The system in accordance with claim 10, wherein the memory is encoded with instructions that when executed by the microprocessor perform the steps of:

allowing at least one of the following: the managed care organization, a physician, or the healthcare facility user using the computing device to data communicate with the server;

displaying, accessible to the managed care organization, the physician or the healthcare facility, received plurality of a display data from the server on the computing device, the display data are related to one or more of the patient record and the percentage of patient goal based on the predetermined wellness goal that the patient record is associated with; and displaying, accessible to the healthcare facility user, received plurality of a display data from the server on the computing device, the display data are related to one or more of the patient record and the percentage of patient goal based on the predetermined wellness goal that the patient record is associated with, and one or more of the healthcare facility record and the percentage of healthcare facility goal based on the predetermined wellness goal that the healthcare facility record is associated with wherein access permissions are enforced by the server based on user role and data segmentation rules.

18. A computer-implemented method executed by a server and a healthcare data management system for tracking wellness goal progression for a managed care organization (MCO) and associated healthcare facilities across a distributed patient population, by transforming timestamped medical readings from patient-operated devices into disease-specific compliance metrics stored in a hierarchical database structure and delivering access-controlled progression displays to diverse user roles, the method comprising:

receiving, by the server, medical readings generated by FDA-certified patient-operated medical monitoring devices assigned to each of a plurality of patients, the medical readings including at least one of blood pressure, body weight, blood oxygen level, blood glucose, electrocardiogram (ECG), or electroencephalogram (EEG) data, each associated with a patient identifier and a timestamp;

receiving the medical readings via one or more of:
 direct wireless transmission from the device to the server;
 local transmission to a patient computing device with subsequent relay to the server;
 wired connection to a computing device for data relay; and creating and storing, by the server, in a structured database:
 a patient record for each patient;
 a healthcare facility record associated with each patient via facility assignment; and
 a managed care organization (MCO) record associated with each healthcare facility;

associating each received medical reading with the corresponding patient, healthcare facility, and MCO record in the hierarchical database;

defining, by the server, a wellness goal for a defined disease state and associated threshold criteria for medical readings relevant to the disease;

applying one or more segmentation rules to the structured data to define a patient population recordset, wherein the segmentation rules comprise at least one of:
 patient demographics,
 disease state,
 physician assignment,
 healthcare facility affiliation, or
 timestamp intervals;

calculating, by the server:
 a patient percentage-of-goal compliance score for each individual patient in the recordset based on the defined wellness goal;
 a healthcare facility percentage-of-goal compliance score for each healthcare facility based on patients assigned to that facility; and
 a percentage-of-goal compliance score for the managed care organization based on patients across affiliated facilities;

identifying, by the server, changes in the percentage-of-goal compliance score over time by comparing newly received readings with previously stored readings for each patient;

restricting, by a user access control module executed by the server, visibility of medical data and compliance results based on user role and assigned hierarchy level, such that:
 a patient or physician is authorized to view that patient's data and compliance status;
 a healthcare facility user is authorized to view compliance data for all patients and physicians associated with the facility; and
 an MCO evaluator or authorized user is authorized to view aggregate facility and MCO-level compliance data;

displaying, on a user interface executing on a computing device:
 for a physician user, the patient's compliance score and related goal progress;
 for a healthcare facility user, patient-level and facility-level compliance scores; and
 for an MCO evaluator or authorized user, patient-level, facility-level, and MCO-level compliance scores, along with identified changes in goal progression over time.

19. The method in accordance with claim 18, wherein the wellness goal is at least one of the following:

a blood pressure goal, the medical monitoring device is a blood pressure monitoring device, the medical reading is a blood pressure reading stored in the medical reading record and associated with a timestamp and patient identifier;

a diabetes blood sugar goal, the medical monitoring device is a glucose monitoring device, the medical reading is a blood glucose reading processed by the server to determine percentage of patient goal;

a body weight goal, the medical monitoring device is a scale device, the medical reading is a body weight reading included in the recordset analyzed by the server;

a body mass index goal, the medical monitoring device is a scale device suitable for measuring body mass index, the medical reading is a body mass index reading analyzed by the server based on predefined thresholds; or a cholesterol goal, the medical monitoring device is a device suitable for measuring cholesterol, the medical reading is a cholesterol reading evaluated for goal compliance within a segmented patient population.

20. The method in accordance with claim 18, further comprising the steps of:
- creating a physician record for one or more physician, the physician record comprises a physician identifier, the patient record comprises the physician identifier associated with the physician that is assigned to the patient, the healthcare facility record comprises the physician identifier associated with the physician that is assigned to the healthcare facility;
- calculating, by the server, for each unique physician identifier discoverable from the patient population recordset a percentage of physician goal based on the predetermined wellness goal, the medical reading record comprises the physician identifier associated with the patient identifier; and
- transmitting structured display data to a computing device based on user authorization level, the display data being related to one or more of the physician record and the percentage of physician goal based on the predetermined wellness goal that the patient record is associated with.

* * * * *